US012429804B2

(12) United States Patent
Yokoyama et al.

(10) Patent No.: US 12,429,804 B2
(45) Date of Patent: Sep. 30, 2025

(54) IMAGE FORMING SYSTEM

(71) Applicant: CANON KABUSHIKI KAISHA, Tokyo (JP)

(72) Inventors: Masashi Yokoyama, Tokyo (JP); Shota Hashimoto, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/731,611

(22) Filed: Jun. 3, 2024

(65) Prior Publication Data

US 2024/0411257 A1 Dec. 12, 2024

(30) Foreign Application Priority Data

Jun. 7, 2023 (JP) ................................ 2023-094015
Apr. 3, 2024 (JP) ................................ 2024-060127

(51) Int. Cl.
*G03G 15/00* (2006.01)
*G03G 21/02* (2006.01)

(52) U.S. Cl.
CPC ..... *G03G 15/5062* (2013.01); *G03G 15/5016* (2013.01); *G03G 21/02* (2013.01)

(58) Field of Classification Search
CPC . G03G 15/5016; G03G 15/5062; G03G 21/02
See application file for complete search history.

(56) References Cited

U.S. PATENT DOCUMENTS 11,640,272 B2 5/2023 Kakomura et al.
2014/0036290 A1* 2/2014 Miyagawa ......... H04N 1/00047 358/1.13
2016/0248943 A1 8/2016 Yokoyama
2019/0312982 A1* 10/2019 Isokawa ............. H04N 1/00047
2023/0074128 A1* 3/2023 Fujita .................... G06T 7/0002
2023/0229368 A1 7/2023 Kakomura et al.

FOREIGN PATENT DOCUMENTS

JP 2012051272 A 3/2012
JP 2018004690 A 1/2018
JP 2018205652 A 12/2018
JP 2019101156 A 6/2019

* cited by examiner

*Primary Examiner* — Hoang X Ngo
(74) *Attorney, Agent, or Firm* — ROSSI, KIMMS & McDOWELL LLP

(57) ABSTRACT

An image forming system includes a printing unit configured to print an image on a sheet, an inspection unit configured to check an image formed on the sheet, based on a check level set from among a plurality of check levels, an adjustment unit configured to adjust an image forming condition of the printing unit, and a controller configured to control, in a case in which a first check level is set, the adjustment unit to perform adjustment of the image forming condition in a case where the printing unit forms images on a first number of sheets, and control, in a case in which a second check level is set, the adjustment unit to perform adjustment of the image forming condition in a case where the printing unit forms images on a second number of sheets.

19 Claims, 15 Drawing Sheets

| PERFORMANCE | PRINTER ENGINE A | PRINTER ENGINE B |
|---|---|---|
| HUE | MIDDLE | HIGH |
| IMAGE POSITION MISALIGNMENT | HIGH | MIDDLE |

| CHECK LEVEL | ADJUSTMENT FREQUENCY |
|---|---|
| 1 ~ 6 | EVERY 200 SHEETS ← REFERENCE |
| 7 | EVERY 160 SHEETS |
| 8 | EVERY 120 SHEETS |
| 9 | EVERY 80 SHEETS |
| 10 | EVERY 40 SHEETS |

CHECK LEVEL 7-10: ADJUSTMENT FREQUENCY OF 50 SHEETS OR LESS

CHECK LEVEL 5-7: ADJUSTMENT FREQUENCY OF 100 SHEETS OR LESS

FIG. 19

PLEASE SET INTERVAL OF ADJUSTMENT TO 100 SHEETS OR LESS

FIG. 20

PLEASE SET INTERVAL OF ADJUSTMENT TO 50 SHEETS OR LESS

FIG. 21

IMAGE FORMING SYSTEM

BACKGROUND OF THE INVENTION

Field of the Invention

The present disclosure relates to an image forming system including an inspection apparatus for checking (inspecting) a sheet (printed product) having an image printed thereon.

Description of the Related Art

An image forming apparatus has been known to perform an adjusting operation of changing an image forming condition based on a reading result of an adjusting chart at predetermined time intervals. The adjusting chart is a sheet having formed thereon an adjusting image for adjusting the image forming condition. With the adjusting operation being performed by the image forming apparatus, the image forming apparatus can suppress variation of a printing position, hue variation, or the like caused by temporal changes of components or used materials such as toner. Further, hitherto, there has been proposed a technology of reading an image formed on a sheet by an inspection apparatus to check (inspect) this image (U.S. Pat. No. 11,640,272 and US 2023/0229368).

As for the inspection apparatus, a user can set a check level used at the time in a case where the inspection apparatus performs inspection. However, in a case where a variation amount of the variation of the printing position, the hue variation, or the like is increased due to the above-mentioned temporal changes, there is a possibility that the image formed by the image forming apparatus does not satisfy the check level set by the user. That is, when a predetermined time period elapses from when the above-mentioned adjusting operation is performed, there is a possibility that the number of sheets that are determined as abnormal is increased.

SUMMARY OF THE INVENTION

An image forming system according to one embodiment of the present disclosure includes a printing unit configured to print an image on a sheet, an inspection unit configured to check an image formed on the sheet, based on a check level set from among a plurality of check levels, an adjustment unit configured to adjust an image forming condition of the printing unit, and a controller configured to control, in a case in which a first check level is set, the adjustment unit to perform adjustment of the image forming condition in a case where the printing unit forms images on a first number of sheets, and control, in a case in which a second check level is set, the adjustment unit to perform adjustment of the image forming condition in a case where the printing unit forms images on a second number of sheets, wherein the second check level is higher than the first check level, and the second number of sheets is smaller than the first number of sheets.

An image forming system according to another embodiment of the present disclosure includes a printing unit configured to print an image on a sheet, an inspection unit configured to inspect the sheet having the image printed thereon by the printing unit at a plurality of check levels having different check accuracies, an adjustment unit configured to perform adjustment of an image quality of an image to be printed by the printing unit, and a controller configured to determine an adjustment frequency at which the adjustment is performed in accordance with each of the plurality of check levels, and control the adjustment unit to perform the adjustment based on the determined adjustment frequency.

Further features of the present invention will become apparent from the following description of exemplary embodiments (with reference to the attached drawings).

BRIEF DESCRIPTION OF THE DRAWINGS

FIG. 19 is an exemplary view of a message.

FIG. 20 is an exemplary view of a message.

FIG. 21 is an exemplary view of a message.

DESCRIPTION OF THE EMBODIMENTS

Now, referring to the accompanying drawings, a description is given of at least one exemplary embodiment of the present disclosure.

<Image Forming System>

Figure 1:
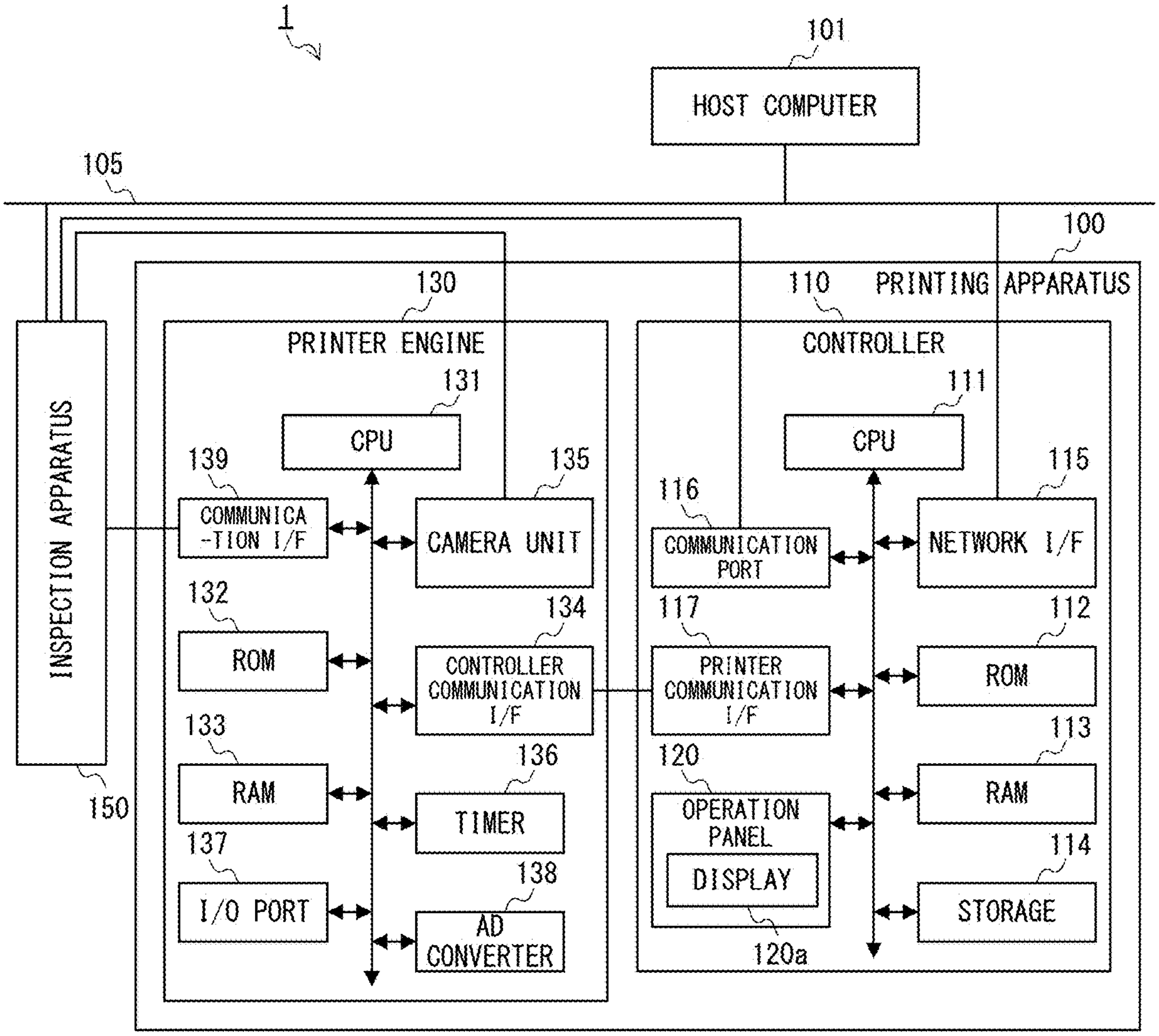
FIG. 1 is an explanatory diagram of an image forming system.

FIG. 1 is an explanatory view of an image forming system of the at least one embodiment. It should be understood that, unless specifically noted, the present disclosure is applicable even to a system configured via a network to perform processing, as long as functions of the present disclosure are implemented.

An image forming system 1 of the at least one embodiment includes a printing apparatus 100 corresponding to an image forming apparatus, an inspection apparatus 150, and a host computer 101 corresponding to an external apparatus. The printing apparatus 100 and the inspection apparatus 150 can communicate to/from the host computer 101 via a communication line 105. Examples of the communication line 105 include a local area network (LAN), a wide area network (WAN), and a public communication line. Further, the communication line 105 may be formed through use of a serial interface, such as a universal serial bus (USB), or a parallel interface. A plurality of host computers 101, a plurality of sets of the printing apparatus 100 and the inspection apparatus 150, or both of them may be provided on the communication line 105.

The host computer 101 includes a user interface (not shown), and generates a print job based on input information acquired from the user interface. The host computer 101 transmits the generated print job to the printing apparatus 100 via the communication line 105. The print job includes an instruction for causing the printing apparatus 100 to perform printing processing, settings, image data, and the like.

The printing apparatus 100 includes a controller 110 and a printer engine 130. The controller 110 performs various types of processing to control the operation of the printing apparatus 100. A description is given here of a configuration in which the controller 110 is built into the printing apparatus 100, but the controller 110 may be independent of the printing apparatus 100 and configured as an apparatus that can communicate to/from the printing apparatus 100.

The controller 110 includes a central processing unit (CPU) 111, a read only memory (ROM) 112, a random access memory (RAM) 113, and a storage 114. Further, the controller 110 includes, as a communication interface, a network interface (I/F) 115, a communication port 116, and a printer communication I/F 117. The controller 110 includes an operation panel 120 corresponding to a user interface. Those components are connected to each other via a system bus so that communication is allowed therebetween.

The operation panel 120 includes an input interface and an output interface. Examples of the input interface include various key buttons and a touch panel. Examples of the output interface include a display 120*a* and a speaker. The controller 110 receives settings and instructions of various operations from the operation panel 120 operated by the user. Further, the controller 110 causes the display 120*a* of the operation panel 120 to display information on the image forming system 1, a printing state, a setting screen, and the like.

The ROM 112 is a non-volatile storage device, and stores a startup program and the like. The storage 114 is a large-capacity storage device for storing, temporarily or in a long term, large-capacity data, such as a control program, image data, and various types of setting data. For example, a hard disk drive (HDD) or a solid state drive (SSD) is used as the storage 114. The CPU 111 executes the startup program stored in the ROM 112 at the time of startup to perform startup processing of the printing apparatus 100. The CPU 111 executes the control program stored in the storage 114 after the startup of the printing apparatus 100 to control operations such as the printing processing to be performed by the printing apparatus 100. The RAM 113 provides a work area used in a case where the CPU 111 performs various types of processing.

The communication port 116 controls communication to/from the inspection apparatus 150. The CPU 111 transmits a signal or the like for controlling the operation of the inspection apparatus 150 via the communication port 116. The CPU 111 acquires an inspection result from the inspection apparatus 150 via the communication port 116. The printer communication I/F 117 controls communication to/from the printer engine 130. The CPU 111 transmits various signals for controlling the operation of the printer engine 130 via the printer communication I/F 117. The network I/F 115 controls communication to/from each of the host computer 101 and the inspection apparatus 150 via the communication line 105. The network I/F 115 transmits data acquired via the communication line 105 to the CPU 111, and transmits data via the communication line 105 in response to an instruction from the CPU 111.

With such a configuration, the CPU 111 decodes the print job acquired from the host computer 101 via the network I/F 115 to generate image data in units of pages. The CPU 111 expands the generated image data to raster image data in units of lines. The CPU 111 transmits the raster image data to the printer engine 130 via the printer communication I/F 117 to cause the printer engine 130 to form an image.

The printer engine 130 is controlled by the controller 110 to print the raster image data generated from the print job onto a printing sheet (sheet) as a visible image. The printer engine 130 includes a CPU 131, a ROM 132, a RAM 133, a controller communication I/F 134, a camera unit 135, a timer 136, an I/O port 137, an AD converter 138, and a communication I/F 139.

The CPU 131 executes a computer program stored in the ROM 132 to control the printer engine 130. The RAM 133 provides a work area used in a case where the CPU 131 executes processing. The controller communication I/F 134 controls the communication to/from the printer communication I/F 117 of the controller 110. The camera unit 135 reads a sheet (printed product) having an image printed thereon.

The timer 136 can measure a time period of an input signal with a high accuracy to output a high-accuracy period signal. The I/O port 137 includes an input port for detecting a signal logic of the printer engine 130, and an output port that can output the logic of the output signal as a binary value. The AD converter 138 converts a voltage value (detection value) of a sensor in the printer engine 130, a primary transfer voltage to be described later, a primary transfer current, a current value of a density detection sensor, a detection signal of a CIS unit to be described later, and the like into digital values to input the digital values to the CPU 131. The communication I/F 139 controls communication to/from the inspection apparatus 150 through serial communication. The communication I/F 139 transmits CIS detection information obtained by the CIS to be described later and the like to the inspection apparatus 150.

The inspection apparatus 150 can communicate to/from the controller 110 via the communication line 105, and can communicate to/from the controller 110 via the communication port 116. The inspection apparatus 150 can communicate to/from the camera unit 135 of the printer engine 130, and can communicate to/from the printer engine 130 via the communication I/F 139.

Figure 2:
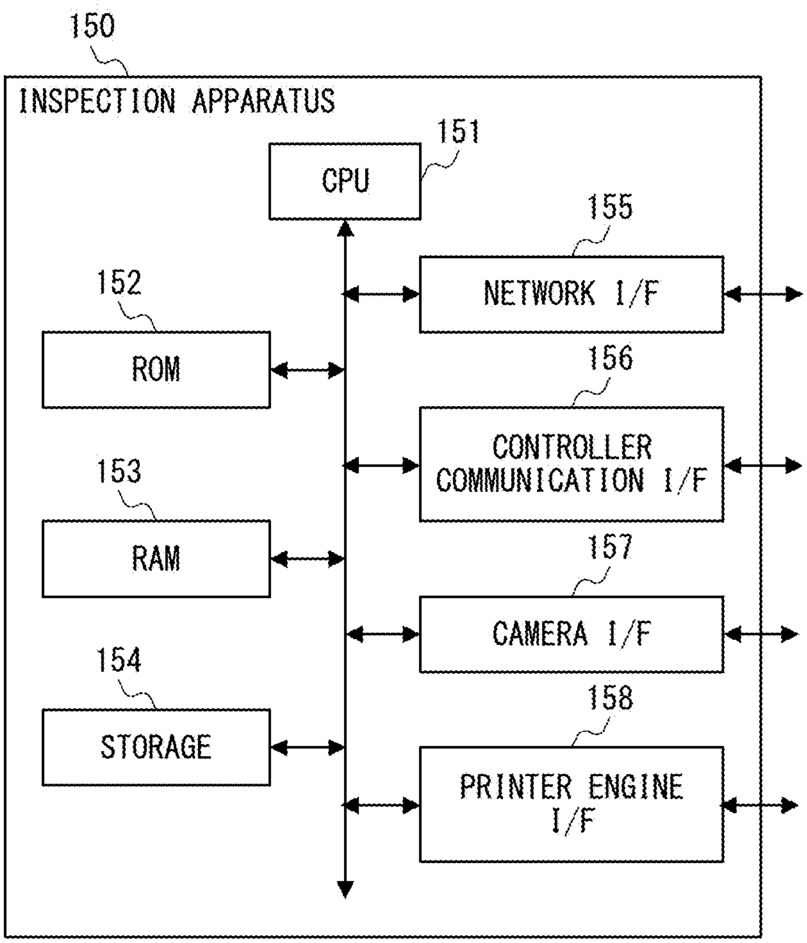
FIG. 2 is an explanatory diagram of an inspection apparatus.

FIG. 2 is an explanatory diagram of the inspection apparatus 150. The inspection apparatus 150 includes a CPU 151, a ROM 152, a RAM 153, a storage 154, a network I/F 155, a controller communication I/F 156, a camera I/F 157, and a printer engine I/F 158.

The CPU 151 executes a computer program, such as a startup program stored in the ROM 152 and a control program stored in the storage 154, to control the inspection apparatus 150. The storage 154 is a large-capacity storage device for temporarily storing large-capacity data, such as an image processing program and image data. For example, an HDD or an SSD is used as the storage 154. The RAM 153 provides a work area used in a case where the CPU 151 executes processing. On the RAM 153, the image processing program of the storage 154, an image of print target data acquired from the host computer 101, an image of a sheet taken by the camera unit 135, working data for image calculation, and the like are loaded.

The network I/F 155 controls communication to/from each of the host computer 101 and the controller 110 via the communication line 105. The controller communication I/F 156 controls communication to/from the controller 110 through serial communication. The camera I/F 157 controls communication to/from the printer engine 130 through high-speed serial communication, and can receive image information indicating an image taken by the camera unit 135. The printer engine I/F 158 controls communication to/from the printer engine 130 through serial communication, and can receive sensor information from the printer engine 130.

The inspection apparatus 150 acquires check item setting, a comparison source image, and the like from the host computer 101 via the communication line 105. The inspection apparatus 150 acquires control information such as page information of the print job from the controller 110. The inspection apparatus 150 is controlled by the printer engine 130 to acquire image information generated from a sheet obtained after image formation and read by the camera unit 135. The inspection apparatus 150 performs a check (inspection) by comparing the comparison source image and the image information acquired from the camera unit 135, based on the check item setting and the page information.

The controller 110 and the camera unit 135 of the printing apparatus 100 are connected to the inspection apparatus 150. The inspection apparatus 150 inspects an image printed on the sheet based on the image read by the camera unit 135. The check level of the inspection apparatus 150 can be set from the host computer 101 or the like via the communication line 105.

Figure 3:
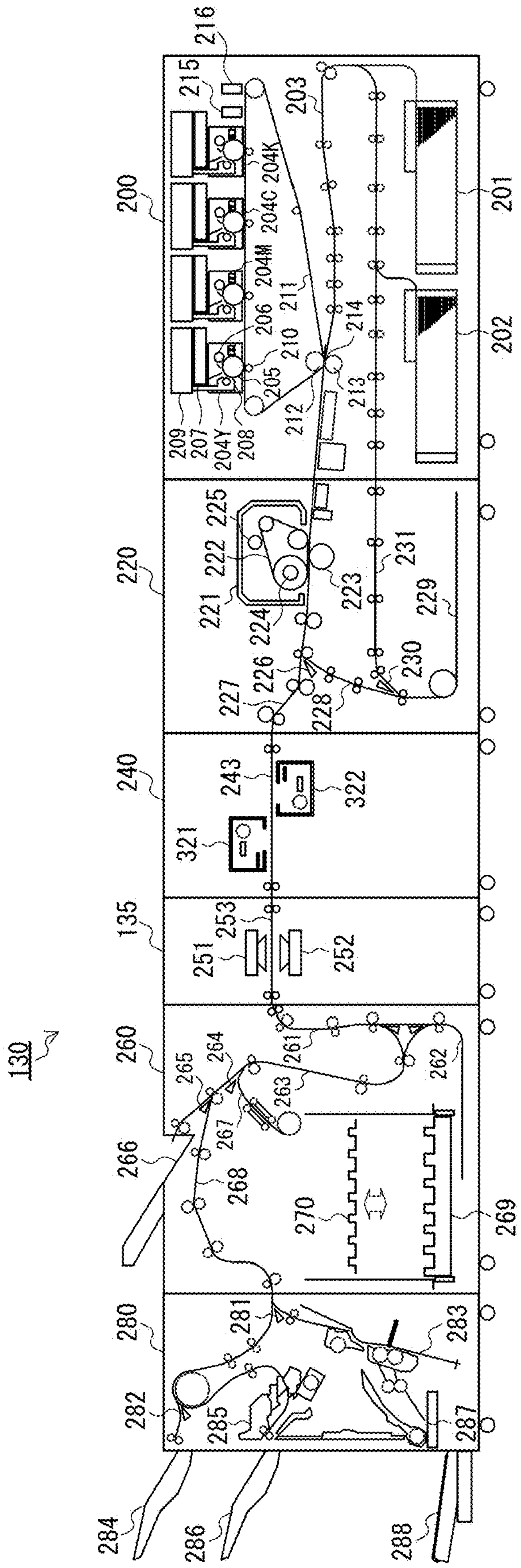
FIG. 3 is a configuration view of a printer engine.

FIG. 3 is a configuration view of the printer engine 130. The printer engine 130 includes an image forming unit 200 for forming an image on a sheet, an image fixing unit 220, an on-sheet reading unit 240, the camera unit 135, a stacker 260, and a finisher 280. The sheet is conveyed in the order of, assuming the image forming unit 200 as the most upstream, the image fixing unit 220, the on-sheet reading unit 240, the camera unit 135, the stacker 260, and the finisher 280. The image forming unit 200 and the image fixing unit 220 form an image forming section.

The image forming unit 200 includes a first sheet feeding deck 201, a second sheet feeding deck 202, image forming portions 204Y, 204M, 204C, and 204K, an intermediate transfer belt 211, a secondary transfer inner roller 212, and a secondary transfer outer roller 213. The secondary transfer inner roller 212 and the secondary transfer outer roller 213 form a secondary transfer portion 214. The image forming portions 204Y, 204M, 204C, and 204K develop respective visible toner images of yellow, magenta, cyan, and black. Each of the image forming portions 204Y, 204M, 204C, and 204K includes a photosensitive drum 205, a charging roller 206, a laser scanner 207, a developing device 208, and a toner hopper 209.

The first sheet feeding deck 201 and the second sheet feeding deck 202 can each store sheets on which images are to be printed. The sheets to be stored in the first sheet feeding deck 201 and the second sheet feeding deck 202 are not always required to be the same in sheet type or size. In a case where the print job is executed, only one uppermost sheet among the sheets stored in the first sheet feeding deck 201 or the second sheet feeding deck 202 is separated to be fed to a conveyance path 203. The fed sheet is conveyed through the conveyance path 203 to the secondary transfer portion 214.

The configurations of the image forming portions 204Y, 204M, 204C, and 204K are described. The image forming portions 204Y, 204M, 204C, and 204K have the same configuration, and hence the image forming portion 204Y is described here. The photosensitive drum 205 is a photosensitive member including a photosensitive layer on its surface. The photosensitive drum 205 is driven to rotate about a drum shaft. The charging roller 206 uniformly charges the surface of the rotating photosensitive drum 205. The laser scanner 207 exposes the charged surface of the photosensitive drum 205 with laser light in accordance with the raster image data to form an electrostatic latent image on the surface of the photosensitive drum 205. The developing device 208 develops the electrostatic latent image into a visible toner image.

As described above, a yellow toner image is formed on the surface of the photosensitive drum 205 of the image forming portion 204Y. A magenta toner image is formed on the surface of the photosensitive drum 205 of the image forming portion 204M. A cyan toner image is formed on the surface of the photosensitive drum 205 of the image forming portion 204C. A black toner image is formed on the surface of the photosensitive drum 205 of the image forming portion 204K. The toner hopper 209 conveys toner of a corresponding color from a toner bottle (not shown), and supplies a predetermined stable amount of toner to the corresponding developing device 208.

A primary transfer roller 210 is arranged at a position opposed to the photosensitive drum 205 of each of the image forming portions 204Y, 204M, 204C, and 204K across the intermediate transfer belt 211. In a case where a primary transfer bias is applied to the primary transfer roller 210, a toner image of each color is transferred onto the intermediate transfer belt 211 in a superimposed manner from each photosensitive drum 205.

The intermediate transfer belt 211 is rotated in the clockwise direction of FIG. 3, and the toner images of the respective colors are transferred in a superimposed manner from the photosensitive drums 205 of the respective image forming portions 204Y, 204M, 204C, and 204K onto the intermediate transfer belt 211 so that a four-color full color image is formed thereon. Further, the intermediate transfer belt 211 is rotated to convey the formed full color image to the secondary transfer portion 214. The secondary transfer portion 214 collectively transfers the toner images of the respective colors borne by the intermediate transfer belt 211 onto the sheet by a secondary transfer bias applied between the secondary transfer inner roller 212 and the secondary transfer outer roller 213. In order to transfer the toner images onto a predetermined position of the sheet, the timing at which the sheet is conveyed to the secondary transfer portion 214 and the timing at which the toner images are conveyed to the secondary transfer portion 214 are adjusted. The sheet having the toner images transferred thereon is conveyed to the image fixing unit 220.

A first optical sensor 215 and a second optical sensor 216 are arranged on the downstream side of the image forming portion 204K and the upstream side of the secondary transfer portion 214 in a rotating direction of the intermediate transfer belt 211. The first optical sensor 215 applies light to a patch pattern which is a toner image formed on the intermediate transfer belt 211 by the image forming portions 204Y, 204M, 204C, and 204K, and detects an amount of light reflected therefrom. Thus, the first optical sensor 215 can detect an image density of the toner image. The second optical sensor 216 applies light to a color misregistration detection pattern which is a toner image of each color formed on the intermediate transfer belt 211 by the image forming portions 204Y, 204M, 204C, and 204K, and detects the change timing of the amount of the light reflected therefrom. The second optical sensor 216 can detect a color misregistration amount of each of the toner images of the respective colors of yellow, magenta, cyan, and black.

The image fixing unit 220 includes a fixing device 221, a sheet discharge path 227, an inversion path 228, an inversion standby path 229, a sheet refeeding path 231, a sheet discharge flapper 226, and an inversion flapper 230. The fixing device 221 thermally fixes the toner images to the sheet to permanently fix the toner images. The fixing device 221 includes a fixing belt unit 222, a pressure roller 223, a heater 224, and a refresh roller 225.

The fixing belt unit 222 is formed by stretching a fixing belt by metal rollers. The fixing belt includes an elastic member made of silicon rubber laminated on a surface of a metal belt. The fixing belt unit 222 is heated by the heater 224. The pressure roller 223 has a function of nipping and conveying the sheet between the pressure roller 223 and the fixing belt unit 222 to apply pressure to the sheet. On the sheet nipped and conveyed by the fixing belt unit 222 and the pressure roller 223, the toner is melted and pressure-bonded so that the toner images are fixed. In this manner, a full color image is formed on the sheet.

In general, the refresh roller 225 is separated apart from the fixing belt unit 222. The refresh roller 225 is brought into abutment against the fixing belt unit 222 by a drive unit (not shown) at predetermined time intervals so as to be driven to rotate. With the refresh roller 225 being brought into abutment and rotated, the surface layer of the fixing belt unit 222 is polished and flattened. In this manner, a good fixing characteristic of the fixing belt unit 222 is maintained.

In a case where the image formation has been finished in simplex printing or image formation onto both surfaces has been finished in duplex printing, the sheet that has passed through the fixing device 221 is conveyed by the sheet discharge flapper 226 to the sheet discharge path 227. The sheet conveyed to the sheet discharge path 227 is conveyed to the on-sheet reading unit 240.

In a case where the image formation onto only one surface has been finished in the duplex printing, the sheet that has passed through the fixing device 221 is conveyed by the sheet discharge flapper 226 to the inversion path 228. The sheet that has been conveyed to the inversion path 228 is reversely conveyed after being conveyed to the inversion standby path 229, and is conveyed by the inversion flapper 230 to the sheet refeeding path 231. In this manner, an image forming surface of the sheet is inverted. The sheet is reconvened to the secondary transfer portion 214 through the conveyance path 203. In the secondary transfer portion 214, the toner images are transferred onto the inverted image forming surface of the sheet. In this manner, the image formation is performed onto both surfaces of the sheet.

Figure 4:
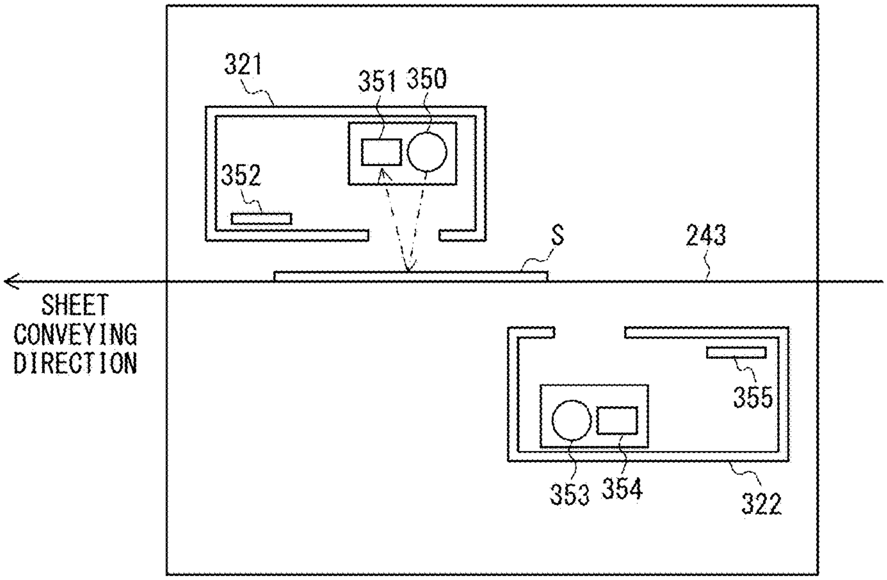
FIG. 4 is a configuration view of CIS units.

The on-sheet reading unit 240 includes contact image sensor (CIS) units 321 and 322 and a conveyance path 243. The CIS unit 321 and the CIS unit 322 are arranged to be opposed to each other across the conveyance path 243. FIG. 4 is a configuration view of the CIS units 321 and 322. The CIS unit 321 is used for reading an image on one surface (referred to as "upper surface" or "first surface") of a sheet S conveyed through the conveyance path 243. The CIS unit 322 is used for reading an image on another surface (referred to as "lower surface" or "second surface") of the sheet S conveyed through the conveyance path 243. In the at least one embodiment, the CIS units 321 and 322 each read an image formed on the sheet S at a resolution of, for example, 600 dpi.

The CIS unit 321 includes a white light emitting diode (LED) 350 serving as a light source, a reading sensor 351, and a white plate 352 serving as a reference member for shading. The CIS unit 322 includes a white LED 353 serving as a light source, a reading sensor 354, and a white plate 355 serving as a reference member for shading. In a case where an adjusting chart obtained by forming an adjusting image for adjusting an image forming condition or the like on a sheet is conveyed through the conveyance path 243, the CIS units 321 and 322 perform processing of reading the adjusting image at the timing at which the adjusting chart passes through a predetermined reading position.

The reading of the adjusting image is performed by the CPU 131 causing the white LEDs 350 and 353 to emit light. Reflection light beams being light beams emitted from the white LEDs 350 and 353 and reflected by the adjusting image are received by the reading sensors 351 and 354. The reading sensors 351 and 354 store electrical signals generated by photoelectrically converting the received reflection light beams into the RAM 133 as the sheet image information. The adjusting image is read as described above. The reading sensor may be an optical system sensor such as a CCD image sensor.

The CPU 131 feeds back, based on the sheet image information stored in the RAM 133, the image density of the adjusting image and the color misregistration amount of each color to the image forming condition, to thereby adjust the image forming condition. Thus, the printing density and the printing position accuracy are stabilized. Further, the sheet image information acquired by the on-sheet reading unit 240 is transmitted also to the inspection apparatus 150.

The sheet that has passed through the on-sheet reading unit 240 is conveyed to the camera unit 135. The camera unit 135 includes a camera 251 and a camera 252 arranged at positions opposed to each other across a conveyance path 253. The camera 251 reads an image on the upper surface of the sheet. The camera 252 reads an image on the lower surface of the sheet. The camera unit 135 reads the images on both the surfaces of the sheet through use of the cameras 251 and 252 at the timing at which the sheet conveyed through the conveyance path 253 reaches photographing positions of the cameras 251 and 252. The camera unit 135 transmits sheet image information being a reading result to the inspection apparatus 150. The sheet that has passed through the camera unit 135 is conveyed to the stacker 260.

The cameras 251 and 252 are only required to be capable of optically reading the images. The cameras 251 and 252 are each achieved through use of, for example, a contact image sensor (CIS) or a line scan camera. Examples of the line scan camera include a charge coupled device (CCD) sensor and a complementary metal oxide semiconductor (CMOS) sensor.

The stacker 260 is a large-capacity stacker on which a large amount of sheets can be stacked. The stacker 260 includes, as a tray for stacking sheets, a stack tray including a lift table 270 and an ejection table 269. Further, the stacker 260 includes an escape tray 266 and a conveyance path 268. The escape tray 266 is a discharge destination of a sheet (abnormal sheet) determined as abnormal through inspection. The conveyance path 268 is a path for conveying the sheet to the finisher 280. In order to convey the sheet to the stack tray, the stacker 260 includes conveyance paths 261, 263, and 267, flappers 264 and 265, and a belt conveying unit 267. An inversion unit 262 is provided in the middle of the conveyance path 261. The sheet conveyed from the camera unit 135 is conveyed to any discharge destination based on the designation information of the print job or the determination result obtained by the inspection apparatus 150.

The sheet determined as abnormal by the inspection apparatus 150 is conveyed through the conveyance paths 261 and 263 to be discharged to the escape tray 266 by the flapper 264 and the flapper 265. The adjusting chart whose adjusting image is read by the on-sheet reading unit 240 is also similarly discharged to the escape tray 266.

The discharge destination of the sheet determined as normal by the inspection apparatus 150 or the sheet determined as not being a check target based on the designation of the print job is determined based on the designation of the print job. In a case where the discharge destination is determined to be the stack tray based on the designation of the print job, the sheet is stacked on the lift table 270 via the conveyance paths 261 and 263, the flapper 264, and the belt conveying unit 267. In a case where post-processing is required based on the designation of the print job, the sheet is conveyed to the finisher 280.

The lift table 270 is movable upward and downward, and is positioned on the upper side under a state in which no sheet is stacked. The lift table 270 is lowered by an amount corresponding to a height (thickness) of a plurality of stacked sheets (sheet bundle) as the stacking of the sheets progresses. In this manner, the uppermost surface of the sheet bundle stacked on the lift table 270 is controlled to always have a constant height.

In a case where the stacking of the sheet onto the lift table 270 is completed or a full-stack state is achieved, the lift table 270 is lowered to the position of the ejection table 269. The lift table 270 and the ejection table 269 are configured such that bars for supporting the sheet bundle mesh each other. Accordingly, at a time point at which the lift table 270 is lowered to reach a position lower than that of the ejection table 269, the sheet bundle on the lift table 270 is brought into a state of being reloaded to the ejection table 269. The ejection table 269 is pulled out to the front side of FIG. 3 under a state in which the reloaded sheet bundle has been stacked. The user can easily take out the sheet bundle on the pulled-out ejection table 269.

The sheet to be stacked on the stack tray is once sent to the inversion unit 262. In a case where the sheet is stacked on the stack tray, the sheet is stacked on the lift table 270 after being flipped, and hence the sheet is inverted upside down at the time of stacking. In order to prevent the sheet from being inverted and match the orientation of the sheet, the sheet is sent to the inversion unit 262 so that its orientation is inverted. The sheet to be conveyed to the escape tray 266 or the finisher 280 is not subjected to the inversion operation by the inversion unit 262.

The finisher 280 performs predetermined post-processing set by the user through the print job, on the sheet acquired from the stacker 260. The finisher 280 can perform post-processing, such as stapling processing (one-portion binding or two-portion binding), punching processing (two holes or three holes), and saddle stitch binding processing. The finisher 280 includes three sheet discharge units of two sheet discharge trays 284 and 286 and a saddle stitch binding tray 288. The finisher 280 includes flappers 281 and 282, a saddle stitching unit 283, a staple binding unit 285, and a conveyance unit 287.

In a case where no post-processing such as stapling processing is performed, the sheet is discharged to the sheet discharge tray 284 by the flapper 281 and the flapper 282. In a case where the stapling processing is performed, the sheet is conveyed to the staple binding unit 285 by the flapper 281 and the flapper 282. The staple binding unit 285 executes stapling processing on the conveyed sheet. The sheet subjected to the stapling processing is discharged to the sheet discharge tray 286.

In a case where the saddle stitch binding processing is set as the post-processing, the sheet is conveyed to the saddle stitching unit 283. The saddle stitching unit 283 performs saddle stitching by folding the sheet after performing stapling processing at the center of the sheet. After the saddle stitch binding processing is ended, the bound sheet bundle (saddle stitch-bound bundle) is discharged to the saddle stitch binding tray 288 via the conveyance unit 287. The saddle stitch binding tray 288 has a belt conveyor configuration. The saddle stitch-bound bundle stacked on the saddle stitch binding tray 288 is conveyed to the left side of FIG. 3 by the belt conveyor.

<Inspection Method>

The inspection apparatus 150 checks (inspects) the sheet image information acquired from the camera unit 135 in accordance with check items set in advance. There are various check items, but, as an example, a description is given here of an example in which a barcode readable check and a front-back matching check are performed.

Figure 5:
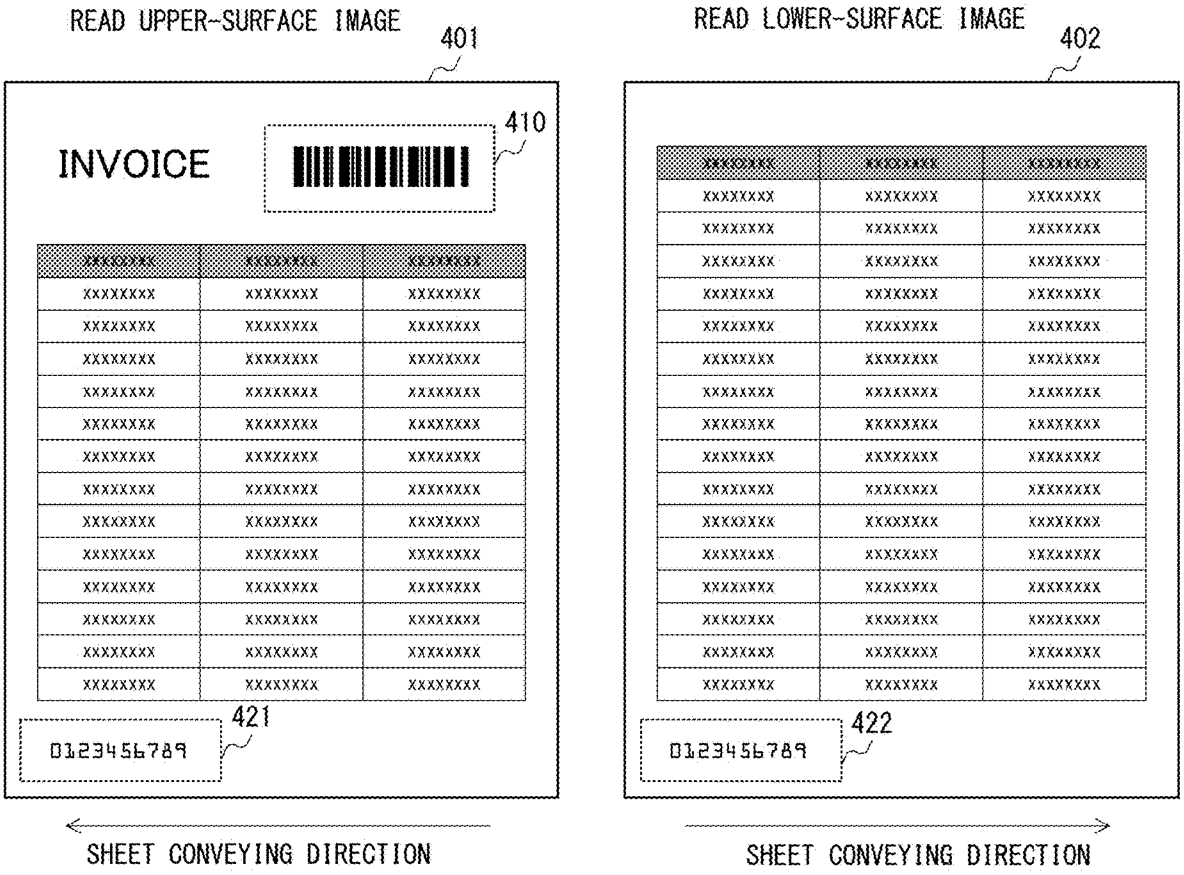
FIG. 5 is an explanatory view of inspection.

FIG. 5 is an explanatory view of inspection of the sheet image information. A read upper-surface image 401 is a sheet image obtained by reading the image on the upper surface of the sheet, and is a read image read by the camera 251. A read lower-surface image 402 is a sheet image obtained by reading the image on the lower surface of the sheet, and is a read image read by the camera 252. The read upper-surface image 401 includes check areas 410 and 421 serving as check targets, and the read lower-surface image 402 includes a check area 422 serving as a check target.

The inspection apparatus 150 first determines whether or not a barcode present in the check area 410 is readable. In a case where the barcode is readable, it is determined that the barcode is normally printed, and in a case where the barcode is not readable, it is determined that the printing of the barcode has abnormality. Next, the inspection apparatus 150 extracts numerical values in the check areas 421 and 422 as character data through character recognition such as optical character recognition (OCR). It is assumed in this case that the print job is configured so that the same numerical value is printed on the front and back surfaces (upper surface and lower surface) of the sheet in a case where the printing is normally performed. In this manner, it is determined whether or not printing is performed as intended on the front and back surfaces of the sheet. In a case where the numerical values extracted from the check area 421 and the check area 422 are the same, it is determined that the printing is normal, and in a case where the numerical values are different, it is determined that the printing is abnormal. The inspection apparatus 150 performs those checks. In a case where it is determined that the printing is abnormal in any of the checks, the inspection apparatus 150 determines this sheet as an "abnormal sheet," and in a case where no abnormality is detected in any of the checks, the inspection apparatus 150 determines this sheet as a "normal sheet."

The inspection apparatus 150 can perform various checks in addition thereto, such as a printing position check, a sheet overlapping check, a sheet missing check, a color misregistration check, a hue check, streak detection, spot detection, and a full-image comparison check between a read image and original data.

In the at least one embodiment, the check content and the check area described above can be set for the inspection apparatus 150 through, for example, the host computer 101 or the operation panel 120 of the printing apparatus 100 via the communication line 105. In a case where the full-image comparison check is performed, the inspection apparatus 150 acquires a comparison source image from the host computer 101 or the like. Further, as another configuration, an operation unit may be provided in the inspection apparatus 150 so that the check area and the check content can be set through this operation unit.

Figure 6:
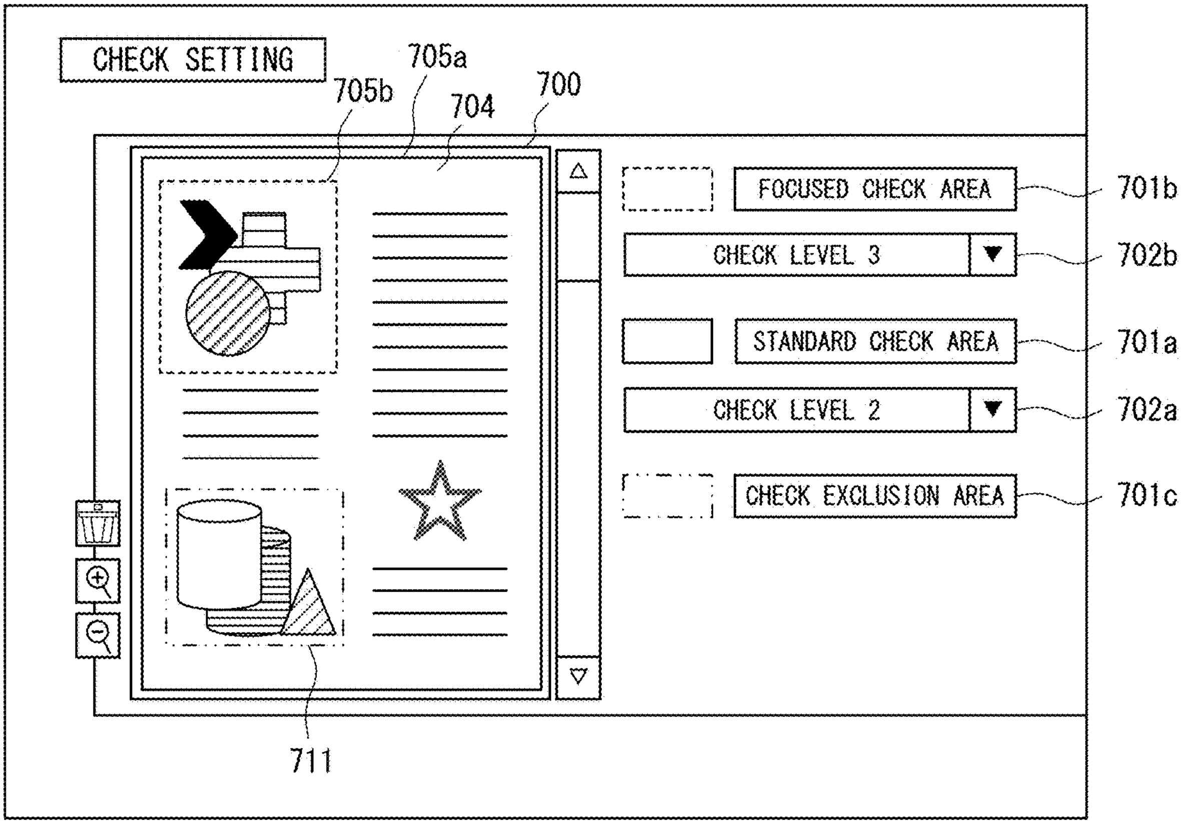
FIG. 6 is an exemplary view of a check setting screen.

FIG. 6 is an exemplary view of a check setting screen for setting the check area and the check content for the inspection apparatus 150. The check setting screen is a screen for allowing the user to give an instruction of check setting including a check area and a check level. In the check area, the inspection apparatus 150 executes inspection. The check level indicates a check accuracy. A description is given here of an example in which the check setting screen is displayed on a display provided in the host computer 101. Thus, the check setting is performed by the host computer 101. In a case where the check setting is performed by the printing apparatus 100, the check setting screen is displayed on the display 120*a* of the operation panel 120.

The check setting screen displays, in a display region 700, an image 704 to be printed, check areas 705*a* and 705*b*, a check exclusion area 711, and the like. In the check setting screen, buttons 701*a*, 701*b*, and 701*c* and pull-down menus 702*a* and 702*b* are also displayed. The host computer 101 includes various input devices, such as a keyboard, a touch panel, and a pointing device. In a case where the buttons 701*a*, 701*b*, and 701*c* and the pull-down menus 702*a* and 702*b* are operated through such input devices, the check areas 705*a* and 705*b* and the check exclusion area 711 are set.

The check area 705*a* is a standard check area set through operation of the button 701*a*. For example, the user can set the check area 705*a* by operating the button 701*a* and determining a range in the image 704 by the pointing device or the like. In the standard check area, for example, a check of a standard content is executed. Examples of the standard content include position misregistration detection, hue detection, and streak detection as the check content. The standard content may be changed depending on the image printed on the printed object. For example, in a case where an image is a text, the hue detection may be excluded from the standard content.

The pull-down menu 702*a* is operated to set the check level (check accuracy) to be applied to the check area 705*a*. In this example, "check level 1" has the lowest check accuracy, and the check accuracy increases as the number of the check level increases. The maximum value of the check level is, for example, "10" (check level 10). The pull-down menu may also be called a drop-down list.

The check area 705*b* is a focused check area set through operation of the button 701*b*. For example, the user can set the check area 705*b* by operating the button 701*b* and determining a range in the image 704 by the pointing device or the like. In the focused check area, for example, a high-accuracy check is executed, and the focused check area has a larger number of check contents than those of the standard check area. In the example of FIG. 6, for figures, such as a circle and a cross shape, in the check area 705*b*, a high-accuracy check in which the number of check contents is increased as compared to the standard check area is executed. The pull-down menu 702*b* is operated in order to set the check level (check accuracy) to be applied to the check area 705*b*.

The check exclusion area 711 is an area in which no check is executed, which is set by operating the button 701*c*. For example, the user can set the check exclusion area 711 by operating the button 701*c* and determining a range in the image 704 by the pointing device or the like. In this case, no check is required for a cylindrical shape and a triangle in the check exclusion area 711. Accordingly, a region including those figures is set as the check exclusion area 711.

As described above, the check content and the check level can be set for each region in the image 704 to be printed. Thus, the user can set an appropriate check reference for each region. As a result, a printed object having an allowable quality is determined as normal, and hence unnecessary reprinting is reduced, and the productivity is improved. Further, unnecessary disposal of the sheet is reduced.

<Automatic Adjustment>

A description is given of an automatic adjusting operation performed by the printing apparatus 100 of the at least one embodiment. As the printing apparatus 100 (printer engine 130) continues image formation, there is a possibility that temporal changes of components, variation factors, such as temperature and humidity, deformation of members, adhesion of foreign matters to the cameras 251 and 252 and the CIS units 321 and 322, and the like occur. In order for the printing apparatus 100 to continuously maintain a certain image quality even in a case where the printing apparatus 100 is affected by those factors, the printing apparatus 100 executes the automatic adjusting operation. Examples of the automatic adjusting operation include color misregistration correction, toner tone density correction, fixing roller surface refresh control, shading correction of the CIS units 321 and 322, and dust correction of the CIS units 321 and 322. Those operations are described.

The color misregistration correction is described. The color misregistration correction is control of performing correction so that no color misregistration is caused in the toner images of the respective colors of yellow, magenta, cyan, and black in a case where the above-mentioned image forming portions 204Y, 204M, 204C, and 204K and the laser scanner 207 form the toner images of the respective colors. The color misregistration amount varies due to, for example, temperature change of the laser scanner 207 or the photosensitive drum 205 of each of the image forming portions 204Y, 204M, 204C, and 204K. Accordingly, it is required to correct the image forming condition such as an irradiation start position (writing start timing of an image) of laser light applied by the laser scanner 207 by detecting the current color misregistration amount during execution of the print job and calculating an appropriate color misregistration correction amount.

Figure 7:
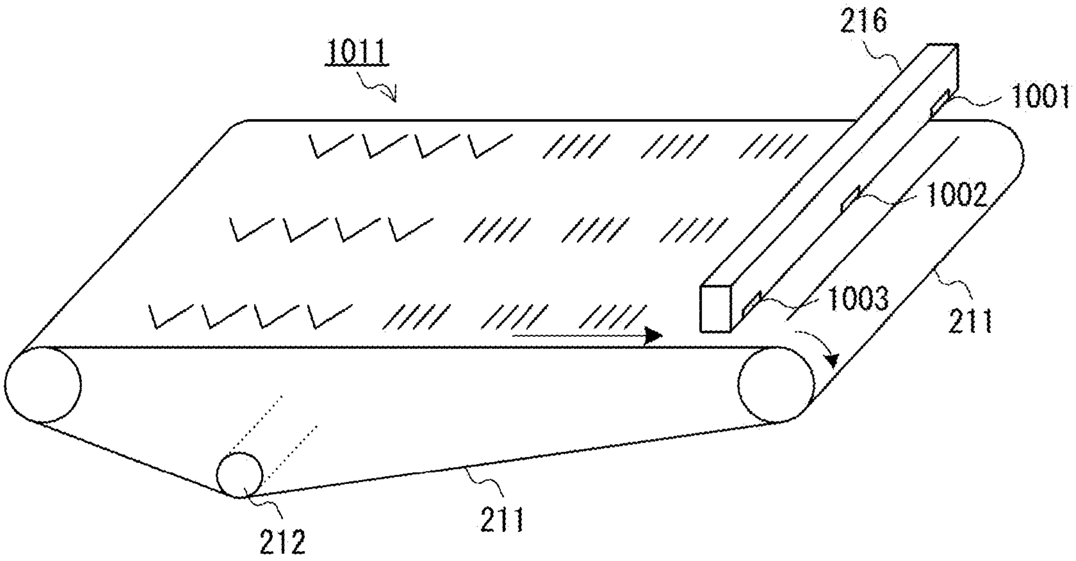
FIG. 7 is an explanatory view of an adjusting image for correcting color misregistration.

FIG. 7 is an explanatory view of an adjusting image for correcting color misregistration. An adjusting image 1011 is a pattern image formed of toner images of respective colors of yellow, magenta, cyan, and black, and is formed on the intermediate transfer belt 211. The second optical sensor 216 includes reflection light amount sensors 1001, 1002, and 1003 that are arranged side by side in a direction intersecting with the rotating direction of the intermediate transfer belt 211. The adjusting image 1011 has a three-row configuration in the direction intersecting with the rotating direction of the intermediate transfer belt 211 so as to correspond to reading positions of the respective reflection light amount sensors 1001, 1002, and 1003. Color misregistration amounts of yellow, magenta, cyan, and black are detected based on a shift of detection timings of the pattern images of the respective colors detected by the reflection light amount sensors 1001, 1002, and 1003.

Examples of the color misregistration amount include position misregistration in a main scanning direction and magnification misregistration in the main scanning direction at the time when the laser scanner 207 scans the photosensitive drum 205, and position misregistration in a sub-scanning direction, which is the rotating direction of each of the photosensitive drum 205 and the intermediate transfer belt 211. The writing start timing of the laser scanner 207 is adjusted based on the color misregistration amount of each of yellow, magenta, cyan, and black detected from the adjusting image for correcting color misregistration. Thus, the color misregistration can be suppressed.

The color misregistration correcting operation may be performed in a period between normal image formations of respective pages, however, in order to perform correction with a higher accuracy, an image forming interval between the respective pages may be intentionally extended. Thus, the adjusting image of two laps or more of the photosensitive drum 205 may be formed, and then the operation of detecting the color misregistration amount may be performed. In the at least one embodiment, in an initial state, the image forming interval between the respective pages is intentionally extended once while the image formation is performed on one-hundred sheets so that the color misregistration correction is performed.

The toner tone density correction is described. The toner tone density correction is control for obtaining stability of a halftone density reproduced by a dither pattern in a case where the image forming portions 204Y, 204M, 204C, and 204K generate the visible toner images. Halftone image information included in the print job is converted into the dither pattern by the controller 110 to be used for exposure of the laser scanner 207. At this time, the stability of dots forming the dither pattern changes depending on, for example, the state of the toner in the developing device 208, and hence the halftone image density may change over time.

Figure 8:
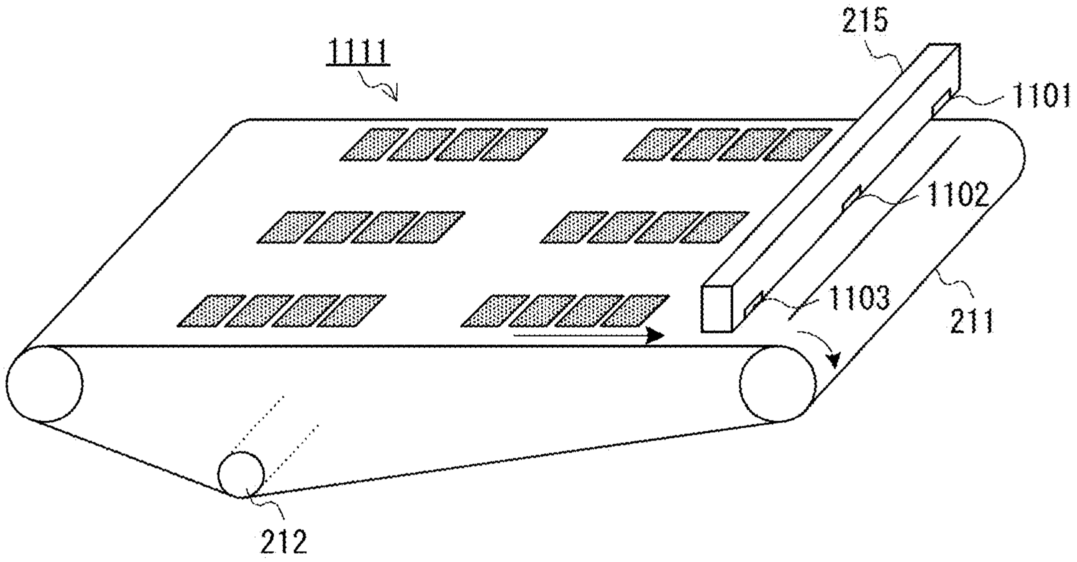
FIG. 8 is an explanatory view of an adjusting image for correcting a tone density.

FIG. 8 is an explanatory view of an adjusting image for correcting a tone density. An adjusting image 1111 is a halftone patch pattern image formed of toner images of respective colors of yellow, magenta, cyan, and black, and is formed on the intermediate transfer belt 211. The first optical sensor 215 includes reflection light amount sensors 1101, 1102, and 1103 that are arranged side by side in the direction intersecting with the rotating direction of the intermediate transfer belt 211. The adjusting image 1111 has a three-row configuration in the direction intersecting with the rotating direction of the intermediate transfer belt 211 so as to correspond to reading positions of the respective reflection light amount sensors 1101, 1102, and 1103.

The reflection light amount sensors 1101, 1102, and 1103 receive reflection light beams reflected from the halftone patch pattern image and read the amounts of the reflected light beams. The reflection light amount sensors 1101, 1102, and 1103 apply light to the toner images (adjusting image 1111) formed on the intermediate transfer belt 211, and receive specularly reflected light and diffusely reflected light therefrom. The reflection light amount sensors 1101, 1102, and 1103 each AD-convert an electrical signal corresponding to a light amount of each of the specularly reflected light and the diffusely reflected light. A calculation expression suitable for each color is applied to each AD conversion value obtained through the AD conversion so that the halftone density of each color can be obtained.

A look-up table for reversely correcting the halftone densities of yellow, magenta, cyan, and black detected as described above to become intended halftone densities determined in advance is generated. With this look-up table, the halftone densities are maintained to intended characteristics.

The toner tone density correcting operation may be performed during a period between normal image formations of respective pages, and, in order to perform correction with a higher accuracy, an image forming interval between the respective pages may be intentionally extended. Thus, halftone patch pattern images of a larger number of halftones may be formed, and the toner tone density correcting operation may be performed with a high accuracy from a low density region to a high density region. In the at least one embodiment, in the initial state, the image forming interval between the respective pages is intentionally extended once while the image formation is performed on two-hundred sheets so that the toner tone density correction is performed.

The fixing roller surface refresh control is described. The surface layer of the fixing belt unit 222 is formed of an elastic member as described above in order to achieve satisfactory fixing performance of the toner image. Accordingly, in a case where sheets having the same sheet width are successively conveyed, in the surface layer of the fixing belt unit 222, a step difference may be caused at a sheet cross-section portion, that is, a paper edge portion. In a case where a sheet having a wider sheet width than the width of the step difference arrives under this state, a difference is caused in heat fixing performance due to this step difference part. This step difference sometimes appears as a gloss streak. In particular, in a case where a part with the step difference of the surface layer of the fixing belt unit 222 overlaps a solid portion of a sheet having a wide sheet width, the gloss streak becomes remarkable and leads to reduction in image quality.

The refresh roller 225 is normally separated apart from the fixing belt unit 222, but is brought into abutment against the fixing belt unit 222 by a drive unit (not shown) at predetermined time intervals so as to be driven to rotate. With the refresh roller 225 being brought into abutment and driven to rotate, the step difference caused on the fixing belt unit 222 is flattened.

The operation of flattening the step difference caused in the fixing belt unit 222 by the refresh roller 225 is required to be performed at certain time intervals so that a page including a sheet having a wide sheet width may arrive anytime. However, jitters occur in the rotation of the fixing belt during this operation, and hence a normal fixing operation cannot be performed on the sheet. Accordingly, the fixing belt surface layer is flattened while the image forming interval between the respective pages is intentionally extended and normal arrival of the sheet is temporarily stopped. In the at least one embodiment, in the initial state, the fixing roller surface refresh control is set to be performed every time fixing processing is performed on three-hundred sheets.

The shading correction of the CIS units 321 and 322 is described. As illustrated in FIG. 4, the CIS unit 321 turns on the white LED 350 controlled by the CPU (not shown) to apply light to the front surface side of the sheet S. The reflection light reflected from the sheet S is received by the reading sensor 351. The image density of the front surface of the sheet S is detected based on the light reception result of the reflection light obtained by the reading sensor 351.

At this time, light is applied linearly in a direction intersecting with the conveying direction of the sheet S. In the reading sensor 351, a plurality of photoelectric conversion elements are arrayed in the same direction as the direction intersecting with the conveying direction of the sheet S (direction of linear light). Accordingly, the main scanning direction of the CIS unit 321 is the direction intersecting with the conveying direction of the sheet S. The sub-scanning direction is the conveying direction of the sheet S. The same applies also to the CIS unit 322.

The light applied from the white LED 350 has light amount unevenness in the main scanning direction, and also the reading sensor 351 has sensitivity unevenness in the main scanning direction. Such light amount unevenness and sensitivity unevenness affect the detection characteristic of the image density in the main scanning direction of the CIS unit 321. In order to stably detect the image density, correction corresponding to this detection characteristic is required.

The light amount unevenness and the sensitivity unevenness vary depending on the lighting time period and the temperature change of the white LED 350 and the driving time period and the temperature change of the reading sensor 351. Accordingly, it is required to perform shading correction by moving the white plate 352 to the reading position of the white LED 350 by a white plate driving motor (not shown) and reading this white plate 352 by the reading sensor 351 to acquire the detection characteristic in a reference state.

During the shading correction, the image density of the sheet S cannot be detected because the white plate 352 is moved and thus the white LED 350 and the reading sensor 351 are blocked from the sheet S side. Accordingly, the shading correction is required to be performed while the image forming interval between the respective pages is intentionally extended and normal arrival of the sheet S is temporarily stopped.

The CIS unit 322 is also required to perform shading correction similarly. In the at least one embodiment, in the initial state, the shading correction of the CIS units 321 and 322 is set to be performed every time printing is performed on five-hundred sheets S.

Figure 9:
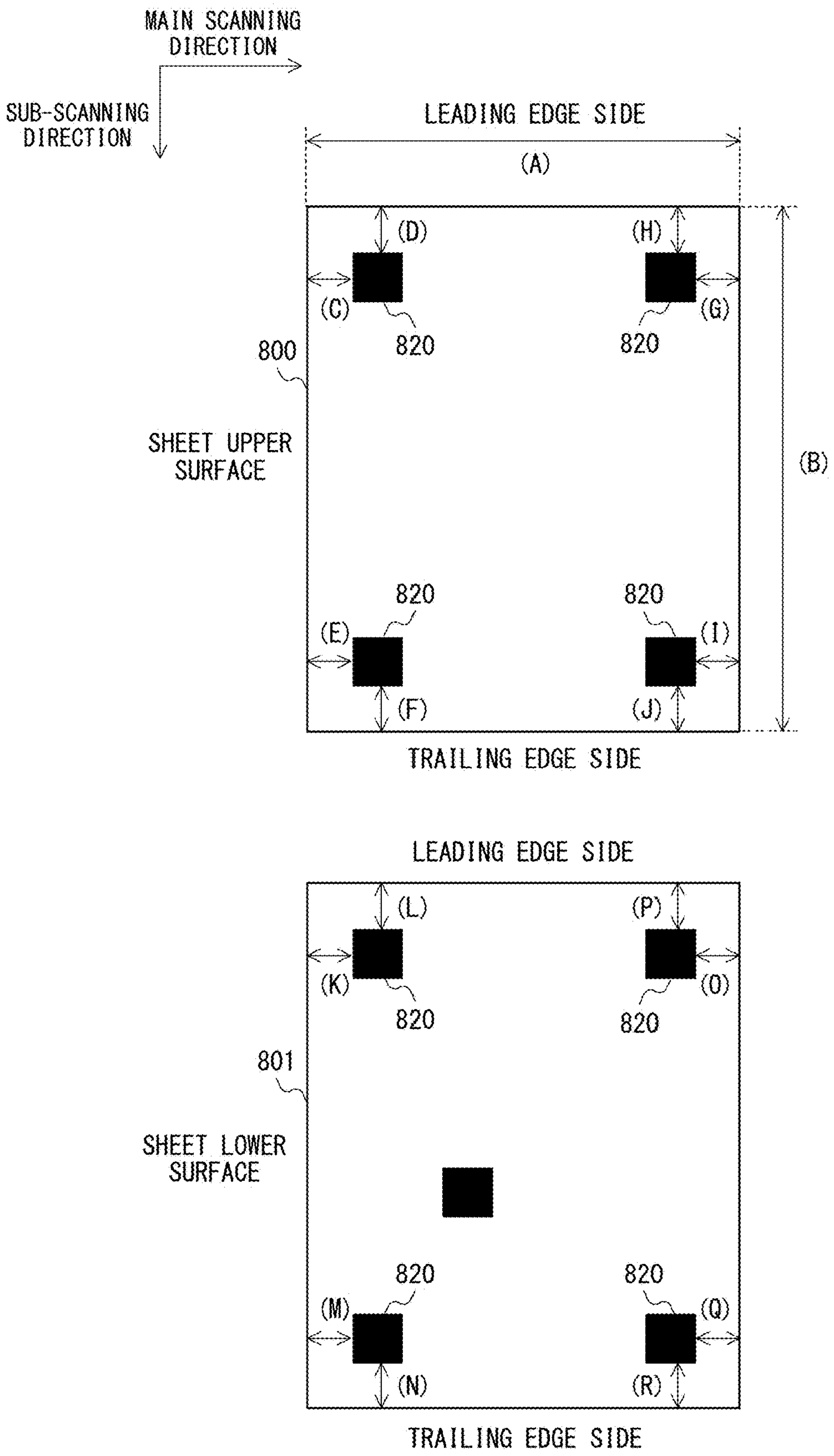
FIG. 9 is an exemplary view of a printing position adjusting chart.

The printing position adjustment control is described. FIG. 9 is an exemplary view of a printing position adjusting chart to be used in the printing position adjustment. A printing position adjusting image 800 for the upper surface is formed on the upper surface of the sheet. A printing position adjusting image 801 for the lower surface is formed on the lower surface of the sheet. The printing position adjusting image 800 and the printing position adjusting image 801 are similar images. The printing position adjusting images 800 and 801 each include marks 820 printed on respective specific positions.

The marks 820 in the printing position adjusting image 800 for the upper surface are read by the camera 251. The marks 820 in the printing position adjusting image 801 for the lower surface are read by the camera 252. The marks 820 are normally formed of toner having a color with a large difference in reflectance with respect to the sheet. In the at least one embodiment, the marks 820 are formed of black toner.

The marks 820 are printed at a total of eight portions at four corners of each of the upper surface and the lower surface of the printing position adjusting images 800 and 801. Each mark 820 is arranged so as to be printed at a position separated by a certain distance from a sheet edge in a case where an ideal printing position is achieved. The misregistration amount of the printing position can be acquired by measuring a relative position of each mark 820 on the printing position adjusting images 800 and 801.

In the at least one embodiment, parts represented by (A) to (R) in FIG. 9 are measurement values measured for adjusting the printing position. Part (A) is a length in the main scanning direction of the printing position adjusting chart. Part (B) is a length in the sub-scanning direction of the printing position adjusting chart. Parts (C) to (R) are distances from the mark 820 to the closest sheet edge. Ideally, each mark 820 is printed at a position separated by a predetermined distance, for example, 1 cm in this case, from the corresponding sheet edge.

A method of calculating the printing position misregistration amount is described. FIG. 10A to FIG. 10G are explanatory views of the method of calculating the printing position misregistration amount.

Figures 10A, 10B, 10C, 10D, 10E, 10F, 10G:
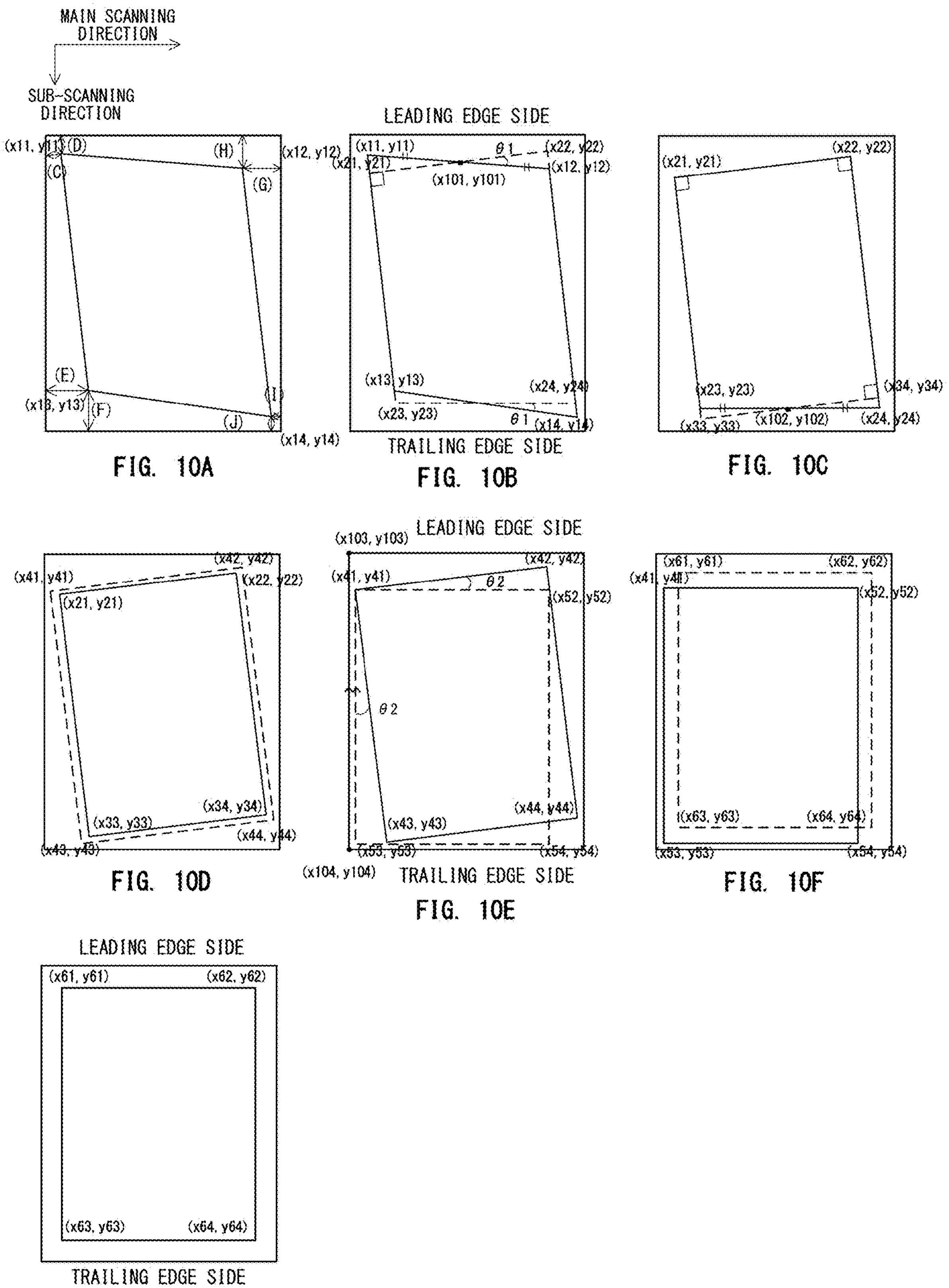
FIG. 10A, FIG. 10B, FIG. 10C, FIG. 10D, FIG. 10E, FIG. 10F, and FIG. 10G are explanatory views for illustrating a method of calculating a printing position misregistration amount.

FIG. 10A is an exemplary view of a reading result of the printing position adjusting image 800 for the upper surface of FIG. 9 obtained by the camera 251. In this case, the distances (C) to (J) between the marks 820 and the sheet edges are represented in a coordinate system using a predetermined position as a reference position, as (x11, y11), (x12, y12), (x13, y13), and (x14, y14). Further, those sets of coordinates are connected to each other by straight lines.

First, right angle correction is performed in order to cause the straight line connecting (x11, y11) and (x12, y12) to each other on the image leading edge side to form a right angle with respect to the straight line connecting (x11, y11) and (x13, y13) to each other. As illustrated in FIG. 10B, the right angle correction is performed by, through use of a position (x101, y101) of a length that is half of the length of the straight line connecting (x11, y11) and (x12, y12) to each other as a reference, obtaining and correcting a sub-scanning writing start position of the image at each position in the main scanning direction. In this manner, (x11, y11) becomes (x21, y21), (x12, y12) becomes (x22, y22), (x13, y13) becomes (x23, y23), and (x14, y14) becomes (x24, y24).

Next, trapezoid correction is performed in order to cause the straight line connecting (x23, y23) and (x24, y24) to each other on the image rear edge side to form a right angle with respect to the straight line connecting (x21, y21) and (x23, y23) to each other. As illustrated in FIG. 10C, the trapezoid correction is performed through use of a position (x102, y102) at the half of the length of the straight line connecting (x23, y23) and (x24, y24) to each other as a reference. The trapezoid correction is performed by obtaining and correcting the magnification in the sub-scanning direction at each position in the main scanning direction so that (x23, y23) becomes (x33, y33) and (x24, y24) becomes (x34, y34).

Next, as illustrated in FIG. 10D, the lengths of the image in the main scanning direction and the sub-scanning direction are brought to ideal lengths (the sheet length of −2 cm in each of the main scanning direction and the sub-scanning direction). For this operation, the magnification in each of the main scanning direction and the sub-scanning direction is obtained, and magnification correction is performed through use of a center of the image as a reference. The magnification correction is performed by performing correction so that (x21, y21) becomes (x41, y41), (x22, y22) becomes (x42, y42), (x33, y33) becomes (x43, y43), and (x34, y34) becomes (x44, y44).

Next, as illustrated in FIG. 10E, the straight line connecting (x103, y103) and (x104, y104) to each other of the sheet and the straight line connecting (x41, y41) and (x43, y43) to each other of the image are brought to be parallel to each other. For this operation, through use of (x41, y41) as a reference, the image is rotated by θ2 and the skew state is corrected so that (x42, y42) becomes (x52, y52), (x43, y43) becomes (x53, y53), and (x44, y44) becomes (x54, y54).

Next, as illustrated in FIG. 10F, correction is performed by obtaining a writing start position in each of the main scanning direction and the sub-scanning direction so that the center of the sheet and the center of the image match each other. In a case where the correction is performed through such calculation, the image is corrected as illustrated in FIG. 10G. The lower surface is similarly corrected. In the at least one embodiment, in the initial state, the printing position adjustment is set to be performed every time printing is performed on four-hundred sheets S.

<Printing Processing and Inspection Processing>

Figure 11:
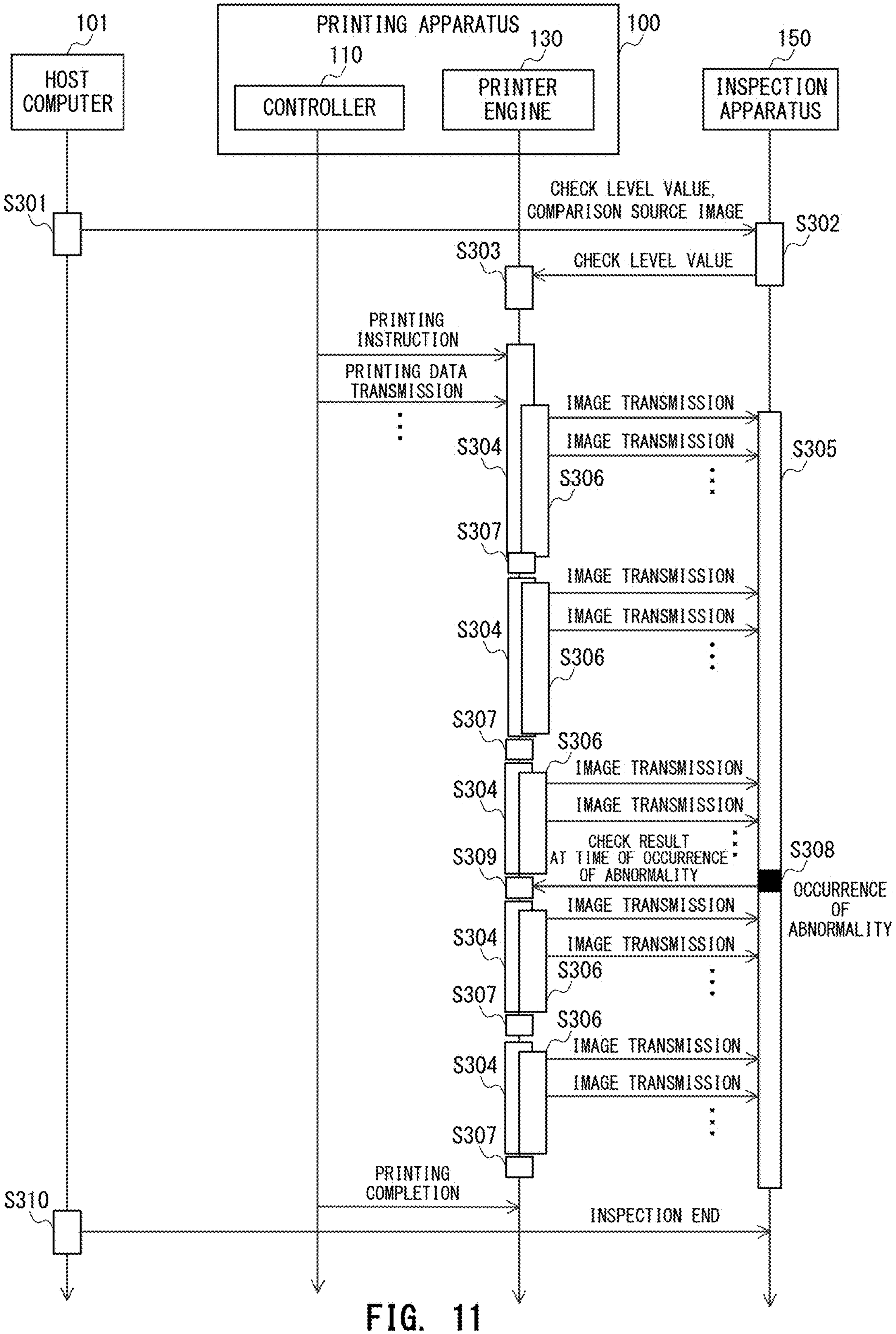
FIG. 11 is a sequence diagram for illustrating passing and receiving of information at the time of printing processing and inspection processing.

FIG. 11 is a sequence diagram for illustrating passing and receiving of information at the time of printing processing and inspection processing in the at least one embodiment.

At the time of setting the check level, the host computer 101 notifies the inspection apparatus 150 of a check level value and a comparison source image to be used in the check (Step S301). The inspection apparatus 150 stores the check level value and the comparison source image acquired from the host computer 101, and notifies the printer engine 130 of the check level value (Step S302). The printer engine 130 sets an adjustment frequency based on the acquired check level value (Step S303).

At the time of printing, the controller 110 transmits a printing instruction and printing data (image data) to the printer engine 130. The printer engine 130 executes printing processing based on the printing instruction and the printing data (Step S304). During printing, the printer engine 130 counts the number of sheets that have finished printing, and determines whether or not to perform the adjusting operation based on the counting result and the adjustment frequency set in advance in the printer engine 130 (Step S306). The printer engine 130 performs the adjusting operation in a case where it is determined to perform the adjusting operation (Step S307).

While the printing apparatus 100 performs the printing processing, the inspection apparatus 150 checks the image transmitted from the printer engine 130 every time the sheet is conveyed (Step S305). The image transmitted here is image information indicating an image read by the camera unit 135 and the on-sheet reading unit 240.

In a case where the inspection apparatus 150 detects occurrence of abnormality of the printed product during printing (Step S308), the inspection apparatus 150 notifies the printer engine 130 of the check result at the time of occurrence of abnormality. The printer engine 130 executes adjustment corresponding to the occurrence of abnormality (Step S309). The printing apparatus 100 executes the processing steps of from Step S304 to Step S309 described above until the end of printing.

<Printer Engine and Image Quality>

Figures 12, 13, 14:
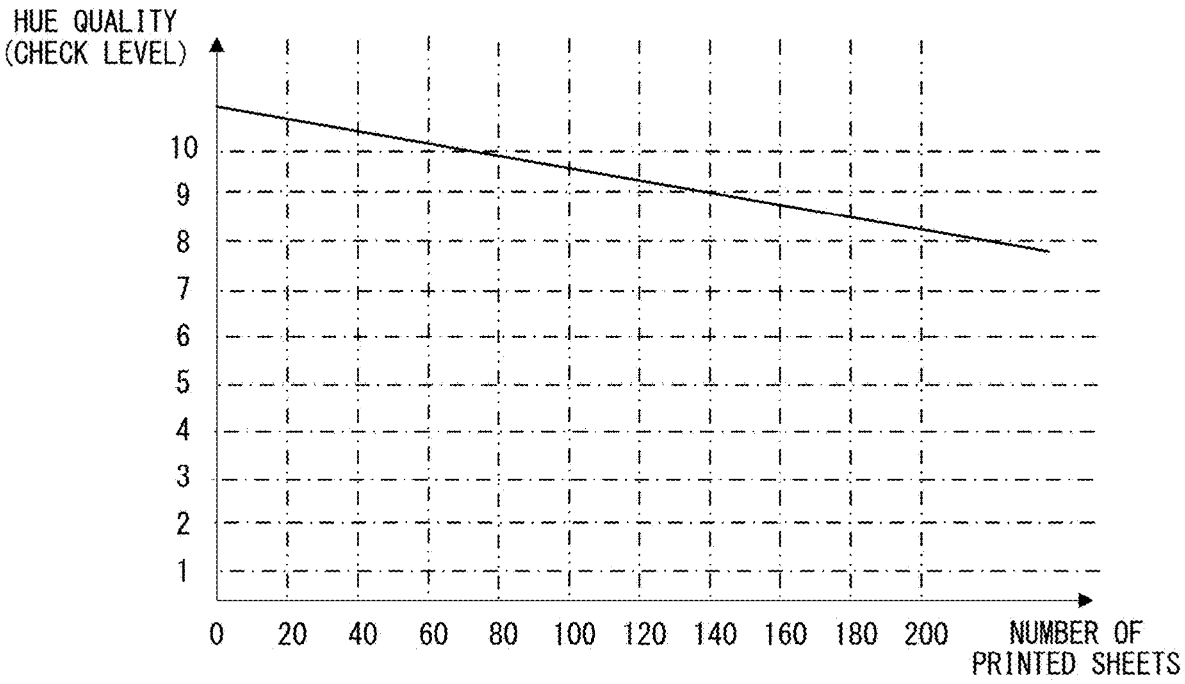
FIG. 12 is an explanatory table of features of image qualities.
FIG. 13 is an explanatory graph of the number of printed sheets and a secured hue quality of the image.
FIG. 14 is an explanatory table of a toner tone density correction frequency corresponding to a check level.

The printer engine 130 and the image quality are described. FIG. 12 is an explanatory table of features of image qualities of output images formed by two printer engines. For example, a printer engine A has a hue quality of "middle." A printer engine B has a hue quality of "high." As the quality regarding the image position misalignment, the printer engine A has a higher quality than the quality of the printer engine B, and is "high."

That is, in a configuration in which the printer engine A and the inspection apparatus 150 are connected to each other, in a case where a strict check level is set for the hue, it is unlikely to be able to continuously output an image satisfying the check level of the hue. However, in this configuration, in a case where a strict check level is set for the item of the image position misalignment, it is highly possible to be able to continuously output an image satisfying the check level of the image position misalignment. The opposite can be said in a configuration in which the printer engine B and the inspection apparatus 150 are connected to each other.

As described above, even in a case where the same check level is set for the same check item, usage of a different printer engine causes a difference in the check result due to its performance difference. Accordingly, in a case where the user sets a high check level in order to perform a high-accuracy check, an image cannot be output with an image quality corresponding to the check level depending on the printer engine, and the number of printed products that are determined as having an abnormality is increased. In view of the above, in the at least one embodiment, the adjustment is performed at a frequency corresponding to the check level so as to prevent in advance downtime from being caused by the adjusting operation after the printer engine is stopped because the printed product is determined as abnormal.

<Image Quality and Adjustment Frequency>

A relationship between the adjustment frequency and the image quality which allows the check level to be satisfied is described with reference to a graph of a relationship between the quality of the hue of the image and the number of printed sheets (number of printed products) which allows the check level to be satisfied.

FIG. 13 is an explanatory graph of the number of printed sheets and the hue quality of the image after execution of the toner tone density correction by the printer engine 130. With reference to FIG. 13, even in the case of the printer engine having the hue quality of "middle," the printed product can satisfy the quality of "10," which is the highest check level, for a while (for about seventy printed sheets) after execution of the toner tone density correction of correcting the hue. However, as the number of printed sheets is increased, the stability of the dots forming the dither pattern changes depending on the state of toner or the like in the developing device, and thus the halftone image density changes over time. Accordingly, there is an increased possibility that the hue quality cannot be satisfied before the next toner tone density correction timing arrives, and thus the image is determined as an abnormal image.

Accordingly, in a case where the user expects a higher quality regarding the hue and sets the check level to a stricter level, for example, sets the check level to the maximum of "10" in the inspection apparatus 150, and this inspection apparatus 150 performs a check, the hue quality is satisfied immediately after the adjustment, but the possibility of determination of an abnormal image is increased as the number of printed sheets is increased. In view of the above, in the at least one embodiment, the toner tone density correction is performed at a frequency corresponding to the check level.

A description is given of the frequency of the toner tone density correction corresponding to the check level. FIG. 14 is an explanatory table of the toner tone density correction frequency corresponding to the check level. In this case, a reference setting value of the check level of the hue is "6," and the corresponding frequency of the toner tone density correction is once in every two-hundred printed sheets. In a case where the user sets the check level of the hue to "10," the toner tone density correction is executed in every forty printed sheets. That is, as the check level is increased, the frequency to execute the correcting operation (adjusting operation) is increased. Description has been given here of the frequency of the toner tone density correction as an example, but the same applies to other correcting operations (adjusting operations). The adjustment frequency corresponding to the check level is not limited to a unique value, and may vary depending on the performance of the printer engine and the type of the adjustment.

The printer engine 130 holds a table which is information indicating the relationship between the check level and the toner tone density correction frequency as exemplified in FIG. 14 in, for example, the RAM 133. This table is referred to by the CPU 131 at the time of setting an adjustment frequency threshold value described later. Further, this table may be displayed in a case where the user sets the check level. For example, in a case where this table is displayed at the timing at which the check setting screen of FIG. 6 is displayed, the user is notified of the relationship between the check level and the adjustment frequency. In this manner, the user can easily set the optimum check level. Further, this table may be displayed at the timing at which the pull-down menus 702*a* and 702*b* are operated through the check setting screen.

In a case where the check level is set by the host computer 101, this table is displayed on the display provided in the host computer 101. In a case where the check level is set through the operation panel 120, this table is displayed on the display 120*a* of the operation panel 120. In a case where a user interface for setting the check level is provided in the inspection apparatus 150, this table is displayed on this user interface.

Figure 15:
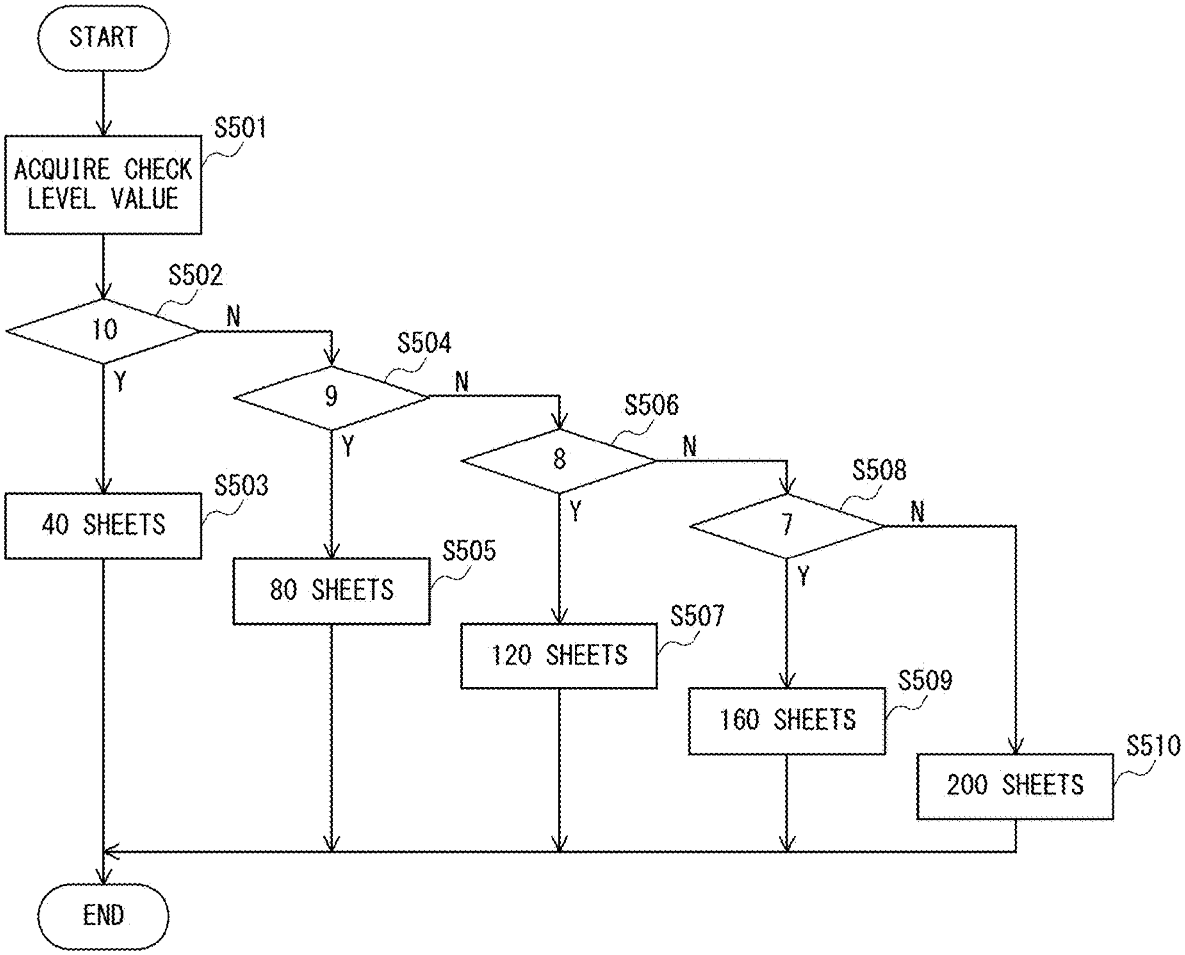
FIG. 15 is a flow chart for illustrating processing of determining a threshold value of an adjustment frequency corresponding to the check level.

FIG. 15 is a flow chart for illustrating processing of determining the threshold value of the adjustment frequency corresponding to the check level. This processing is a detailed description of the processing step of Step S303 of FIG. 11. A description is given here of a case in which the adjustment frequency corresponding to the check level is as shown in FIG. 14.

The CPU 131 of the printer engine 130 acquires the check level value indicating the check level from the inspection apparatus 150 (Step S501). The CPU 131 sets the adjustment frequency threshold value in accordance with the acquired check level value. The adjustment is performed in a case where the number of printed sheets reaches the adjustment frequency threshold value. As described above, the CPU 131 refers to the table indicating the toner tone density correction frequency held in the RAM 133 to determine the adjustment frequency threshold value.

In a case where the check level is “10” (Step S502: Y), the CPU 131 selects forty sheets as the adjustment frequency threshold value (Step S503). In a case where the check level is “9” (Step S502: N, Step S504: Y), the CPU 131 selects eighty sheets as the adjustment frequency threshold value (Step S505). In a case where the check level is “8” (Step S502: N, Step S504: N, Step S506: Y), the CPU 131 selects one-hundred and twenty sheets as the adjustment frequency threshold value (Step S507). In a case where the check level is “7” (Step S502: N, Step S504: N, Step S506: N, Step S508: Y), the CPU 131 selects one-hundred and sixty sheets as the adjustment frequency threshold value (Step S509). In a case where the check level does not correspond to any of “10” to “7” (Step S502: N, Step S504: N, Step S506: N, Step S508: N), the CPU 131 selects two-hundred sheets as the adjustment frequency threshold value (Step S510).

Figure 16:
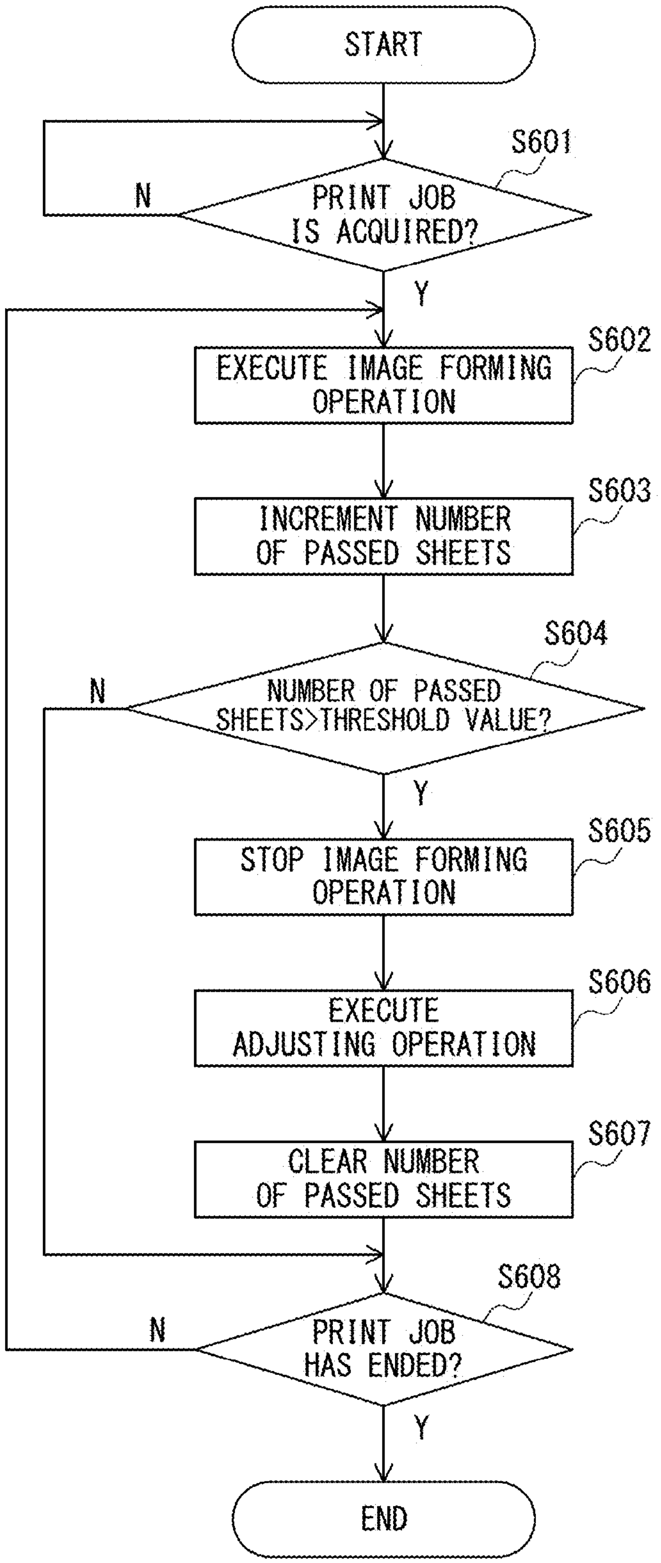
FIG. 16 is a flow chart for illustrating image forming processing including adjusting operation execution determination processing.

FIG. 16 is a flow chart for illustrating image forming processing including adjusting operation execution determination processing. This processing is a detailed description of Step S304, Step S306, and Step S307 of FIG. 11.

The CPU 131 of the printer engine 130 waits for acquisition of the print job from the controller 110 (Step S601: N). In a case where the print job is acquired (Step S601: Y), the CPU 131 executes an image forming operation on one sheet (Step S602). The CPU 131 increments a passed sheet number counter (Step S603). The passed sheet number counter counts the number of sheets that have been printed from the execution of the previous adjustment.

The CPU 131 compares the value of the passed sheet number counter and the adjustment frequency threshold value set in the processing step of Step S303 of FIG. 11 (processing of FIG. 15) (Step S604). In a case where the value of the passed sheet number counter exceeds the adjustment frequency threshold value (Step S604: Y), the CPU 131 stops the image formation operation and executes the adjusting operation (Step S605, Step S606). The CPU 131 clears the passed sheet number counter (Step S607).

After the passed sheet number counter is cleared or when the value of the passed sheet number counter does not exceed the adjustment frequency threshold value (Step S604: N), the CPU 131 determines whether or not the print job has ended (Step S608). In a case where the print job has not ended (Step S608: N), the CPU 131 repeats the processing steps of Step S602 and the subsequent steps. In a case where the print job has ended (Step S608: Y), the CPU 131 ends the image forming processing.

As described above, the image forming system 1 of the at least one embodiment performs the processing of adjusting the image quality at time intervals corresponding to the check level. That is, the frequency of the adjustment processing (adjustment frequency) is determined based on the check level. Thus, even in a case where a high check level is set, the adjustment processing is performed at an appropriate frequency so that the printed product having an image quality satisfying the check level can be obtained. In this manner, the occurrence of downtime due to repetition of the adjusting operation can be suppressed. Further, the increase of the number of sheets that are determined as abnormal can be suppressed. That is, even in a case where a check level stricter than the image quality that can be output by the image forming system 1 is set, the execution frequency of the adjusting operation can be appropriately set so that the printed product can be generated with an image quality satisfying the check level.

Modification Example 1

In the above-mentioned at least one embodiment, in the printing apparatus 100, the printer engine 130 counts the number of sheets on which the printing has been finished, and performs determination on whether or not to execute the adjusting operation in accordance with the counted number of sheets so as to achieve the adjustment frequency corresponding to the check level. However, the counting of the number of sheets and the determination on whether or not to execute the adjusting operation are not always required to be performed by the printer engine 130. A description is given here of a configuration in which the counting of the number of sheets and the determination on whether or not to execute the adjusting operation are performed on the inspection apparatus 150 side.

Figure 17:
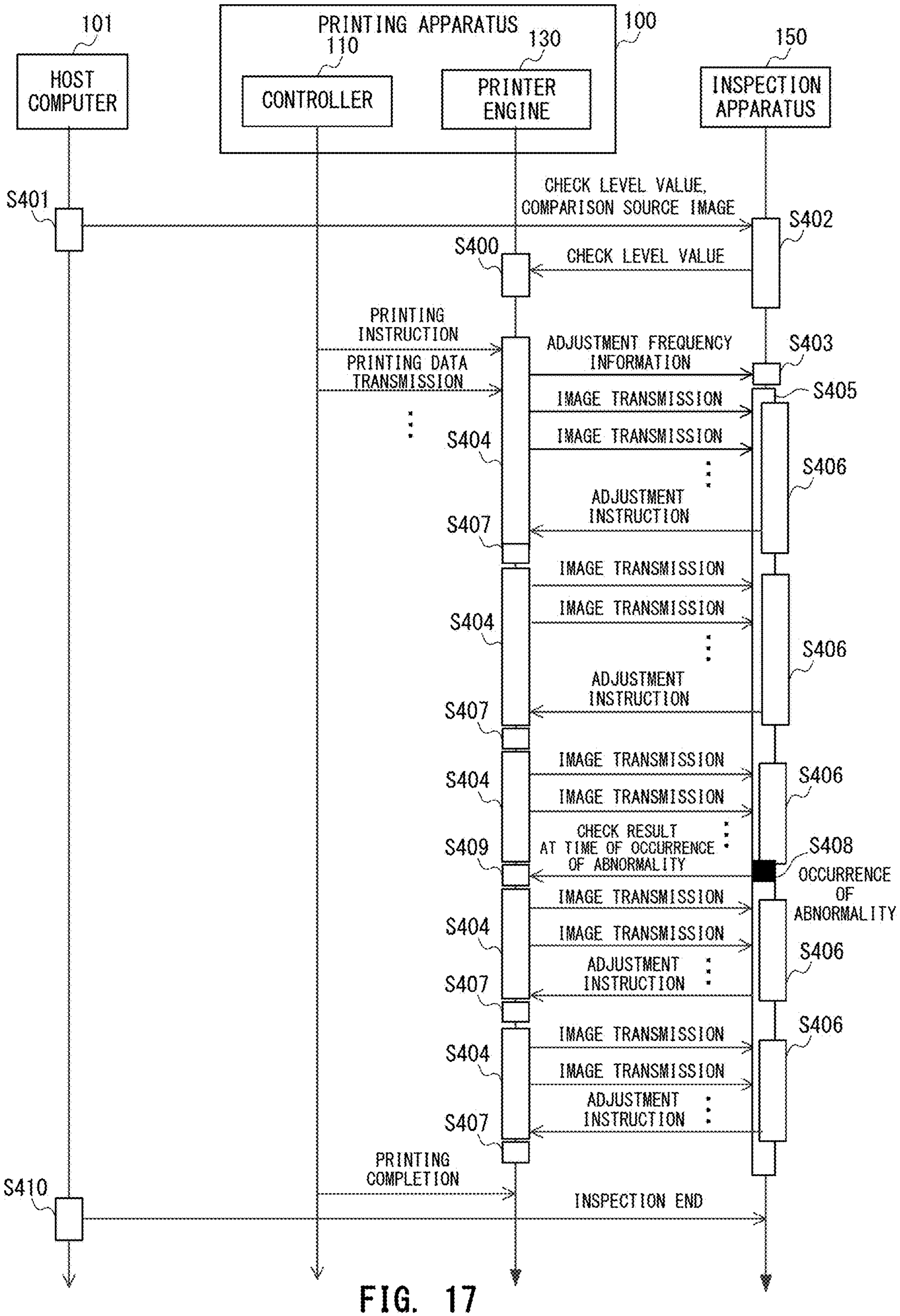
FIG. 17 is a sequence diagram for illustrating passing and receiving of information at the time of printing processing and inspection processing.

FIG. 17 is a sequence diagram for illustrating passing and receiving of information at the time of printing processing and inspection processing in this case.

At the time of setting the check level, the host computer 101 notifies the inspection apparatus 150 of a check level value and a comparison source image to be used in the check (Step S401). The inspection apparatus 150 stores the check level value and the comparison source image acquired from the host computer 101, and notifies the printer engine 130 of the check level value (Step S402). The printer engine 130 notifies the inspection apparatus 150 of the adjustment frequency information indicating the adjustment frequency, based on the acquired check level value (Step S403). The setting of the adjustment frequency is as shown in FIG. 15.

At the time of printing, the controller 110 transmits a printing instruction and printing data (image data) to the printer engine 130. The printer engine 130 executes printing processing based on the printing instruction and the printing data (Step S404).

The inspection apparatus 150 counts the number of printed sheets based on the image information on the image transmitted from the printer engine 130, that is, the image read by the camera unit 135 and the on-sheet reading unit 240. The inspection apparatus 150 compares the counted number of printed sheets and the adjustment frequency information acquired in the processing step of Step S403 (Step S405). The inspection apparatus 150 instructs the printer engine 130 to perform the adjusting operation in a case where the number of printed sheets reaches the adjustment frequency (Step S406). The determination on execution of the adjusting operation is made through the processing steps of Step S405 and Step S406. Details of the processing of determining execution of the adjusting operation are described later.

In a case where the printer engine 130 is notified of the adjusting operation instruction, the printer engine 130 interrupts the printing operation and performs the adjusting operation (Step S407). The printer engine 130 restarts the printing operation after the adjusting operation is completed. In a case where the inspection apparatus 150 detects abnormality in the printed product, the inspection apparatus 150 notifies the printer engine 130 of the check result at the time of occurrence of abnormality (Step S408). The printer engine 130 executes the adjustment processing corresponding to the abnormality (Step S409).

Figure 18:
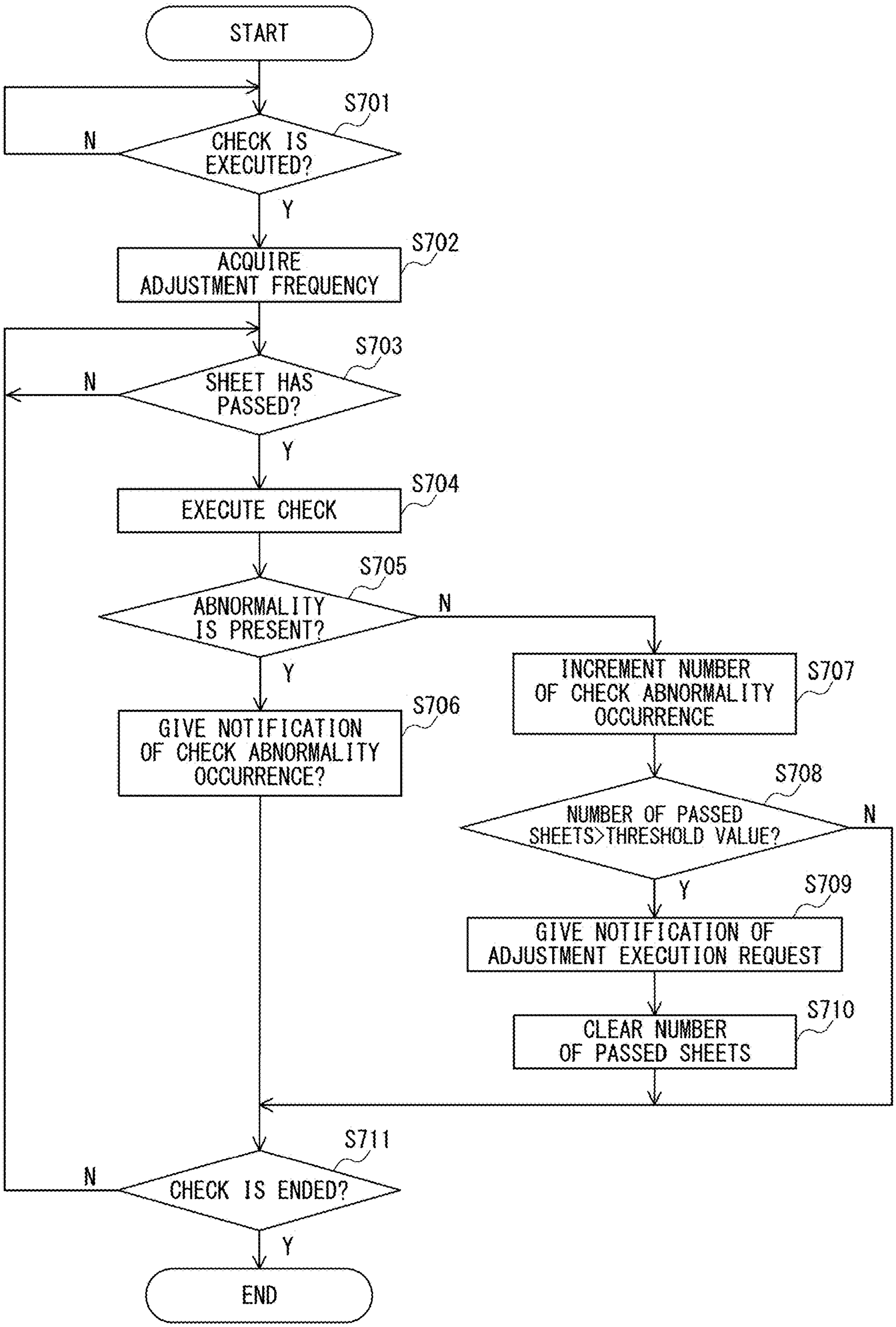
FIG. 18 is a flow chart for illustrating the adjusting operation execution determination processing.

FIG. 18 is a flow chart for illustrating the adjusting operation execution determination processing performed by the inspection apparatus 150. This processing is a detailed description of Step S405 and Step S406 of FIG. 17.

The CPU 151 of the inspection apparatus 150 determines whether or not to execute a check based on whether or not the print job is set as "including a check" (Step S701). In a case where no check is to be executed (Step S701: N), the CPU 151 repeats the processing step of Step S701 until the print job becomes "including a check." In a case where the check is to be executed (Step S701: Y), the CPU 151 acquires the adjustment frequency information given as a notification from the controller 110 in Step S403 of FIG. 17 (Step S702).

The CPU 151 determines whether or not a sheet has passed (Step S703). Whether or not a sheet has passed is determined based on, for example, whether or not the image information on the image read by the camera unit 135 and the on-sheet reading unit 240 is acquired from the printer engine 130. In a case where no sheet has passed (Step S703: N), the CPU 151 waits until a sheet passes. In a case where a sheet has passed (Step S703: Y), the CPU 151 checks the target sheet (Step S704). The CPU 151 determines presence or absence of the abnormality based on the check result (Step S705). In a case where the abnormality is present (Step S705: Y), the CPU 151 notifies the printer engine 130 of the check result of the occurrence of abnormality (Step S706).

In a case where the abnormality is absent (Step S705: N), the CPU 151 increments the passed sheet number counter (Step S707). The value of the passed sheet number counter indicates the number of sheets that have passed from the execution of the previous adjustment. The CPU 151 compares the value of the passed sheet number counter and the adjustment frequency threshold value set in the processing step of Step S403 of FIG. 17 (Step S708). In a case where the value of the passed sheet number counter is larger than the adjustment frequency threshold value (Step S708: Y), the CPU 151 notifies the printer engine 130 of an adjustment execution request (Step S709). The CPU 151 clears the passed sheet number counter (Step S710).

In a case where the value of the passed sheet number counter is equal to or smaller than the adjustment frequency threshold value (Step S708: N), or after the processing steps of Step S706 and Step S710, the CPU 151 determines whether or not to end the check (Step S711). In a case where the check is not to be ended (Step S711: N), the CPU 151 repeats the processing steps of Step S703 and the subsequent steps. In a case where the check is to be ended (Step S711: Y), the CPU 151 ends the adjusting operation execution determination processing of the inspection apparatus 150.

As described above, the inspection apparatus 150 can also perform the counting of the number of sheets and the determination on whether or not to execute the adjusting operation.

Modification Example 2

As described above, the setting of the check level is performed through the check setting screen exemplified in FIG. 6. At the time of setting the check level, the user can set an appropriate check level by knowing the adjustment frequency of each check level. FIG. 19 is an exemplary view of a message displayed in this case. In this example, the adjustment frequency becomes fifty sheets or less in a case where the check level is from 7 to 10, and the adjustment frequency becomes one-hundred sheets or less in a case where the check level is from 5 to 7. The user can set the check level with reference to this message. Further, a recommended check level may be specified in this message.

The message of FIG. 19 is displayed at the time when, for example, the user sets the check level. For example, the message is displayed at the timing at which the check setting screen of FIG. 6 is displayed so that the user can be notified of the relationship between the check level and the adjustment frequency. In this manner, the user can know the relationship between the check level and the adjustment frequency. Further, this message may be displayed at the timing at which the pull-down menus 702*a* and 702*b* are operated through the check setting screen. In a case where the check level is set by the host computer 101, this message is displayed on the display provided in the host computer 101. In a case where the check level is set through the operation panel 120, this message is displayed on the display 120*a* of the operation panel 120. In a case where a user interface for setting the check level is provided in the inspection apparatus 150, this message is displayed on this user interface. With such display of the message, the user can set the check level in accordance with the adjustment frequency.

Modification Example 3

In a case where the adjustment frequency is set in advance, there is a restriction on the setting of the check level. In this case, it is required to set the check level so as to satisfy the condition of FIG. 14. In order to set the adjustment frequency so as to correspond to the check level that the user desires to set, for example, messages exemplified in FIG. 20 and FIG. 21 are displayed.

The message of FIG. 20 is displayed when, for example, the adjustment frequency is set to every two-hundred sheets, and any one of the check levels 5 to 7 is selected. In a case where any one of the check levels 5 to 7 is selected, there is output a notification for urging the user to change the adjustment frequency to one-hundred sheets or less so as to satisfy the condition of FIG. 14.

The message of FIG. 21 is displayed when, for example, the adjustment frequency is set to every two-hundred sheets, and any one of the check levels 7 to 10 is selected. In a case where any one of the check levels 7 to 10 is selected, there is output a notification for urging the user to change the adjustment frequency to fifty sheets or less so as to satisfy the condition of FIG. 14.

As described above, the messages of FIG. 20 and FIG. 21 are displayed in a case where the user sets the check level through the check setting screen and this set level does not correspond to the adjustment frequency set in advance. In a case where the check level is set by the host computer 101, this message is displayed on the display provided in the host computer 101. In a case where the check level is set through the operation panel 120, this message is displayed on the display 120*a* of the operation panel 120. In a case where a user interface for setting the check level is provided in the inspection apparatus 150, this message is displayed on this user interface. With such display of the message, the user can set the check level in accordance with the adjustment frequency.

Modification Example 4

There is a possibility that, after a low check level is set and the image formation is performed on the number of sheets smaller than the number of sheets of the adjustment frequency, a high check level is set before the printing is started by the next print job. In this case, the condition of the adjustment frequency may be satisfied after the check level is changed to a high check level.

For example, after the image formation is performed on one-hundred sheets with the check level of "3," the check level is set to "10" before the printing is performed by the next print job. In a case where the check level is "10," the adjustment frequency is forty sheets with reference to FIG. 14. This is lower than the current number of printed sheets. In this case, it is determined that the number of printed sheets exceeds the adjustment frequency threshold value, and hence the adjusting operation is performed, and the passed sheet number counter is cleared.

Further, the image forming system 1 sometimes performs the adjusting operation due to restart or the like caused by a power operation. In this case, if the decision to perform the adjustment operation is based on the number of sheets printed before the restart, there is a possibility that an adjustment operation that is normally not necessary will be performed. Thus, in a case where the image forming system 1 performs the adjusting operation at the time of restart, the passed sheet number counter is cleared.

Modification Example 5

The check level is set through the check setting screen of FIG. 6 as described above. In the check setting screen, the check level can be set for each area. Accordingly, for example, there is a case in which different check levels are set between the check area 705*a* and the check area 705*b*. In this case, the adjusting operation is performed at an adjustment frequency corresponding to the highest check level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-094015, filed Jun. 7, 2023 and No. 2024-060127, filed Apr. 3, 2024, which are hereby incorporated by reference herein in their entirety.

What is claimed is:

1. An image forming system comprising:

a printing unit configured to print an image on a sheet;

an inspection unit configured to check an image formed on the sheet, based on a check level set from among a plurality of check levels;

an adjustment unit configured to adjust an image forming condition of the printing unit; and a controller configured to:

control, in a case in which a first check level is set, the adjustment unit to perform adjustment of the image forming condition in a case where the printing unit forms images on a first number of sheets, and control, in a case in which a second check level is set, the adjustment unit to perform adjustment of the image forming condition in a case where the printing unit forms images on a second number of sheets, wherein the second check level is higher than the first check level, and the second number of sheets is smaller than the first number of sheets.

2. The image forming system according to claim 1, wherein the controller is configured to:

determine the first number of sheets as an interval at which the adjustment is performed in a case where the first check level is set, and determine the second number of sheets as an interval at which the adjustment is performed in a case where the second check level is set.

3. The image forming system according to claim 2, further comprising an input unit for use in setting the check level, wherein the inspection unit is configured so that the check level is set by the input unit to notify the controller of the set check level, and wherein the controller is configured to determine the number of sheets indicating the interval at which the adjustment is performed in accordance with the check level notified by the inspection unit.

4. The image forming system according to claim 3, further comprising a display unit on which a check setting screen for use in setting the check level is to be displayed, wherein the input unit is configured to receive, as input, information on the check level set through the check setting screen.

5. The image forming system according to claim 4, wherein the input unit is configured to allow check levels to be set for respective areas through the check setting screen, and wherein the controller is configured to determine the number of sheets indicating the interval at which the adjustment is performed, based on a check level having a highest check level among the check levels of the respective areas.

6. The image forming system according to claim 4, wherein the display unit is configured to display information indicating a relationship between the check level and the number of sheets indicating the interval at which the adjustment is performed, at the time of setting the check level through the check setting screen, and wherein the input unit is configured to receive, as input, an instruction of the check level set by a user in accordance with the displayed information.

7. The image forming system according to claim 3, further comprising an output unit configured to output, in a case in which the controller has determined the number of sheets indicating the interval at which the adjustment is performed, in a case where the check level set through the input unit does not correspond to the interval, a notification for urging a user to change the interval.

8. The image forming system according to claim 1, wherein the controller is configured to control, in a case where the check level is changed to the second check level before the images are formed on the first number of sheets at the first check level, the adjustment unit to perform the adjustment in a case in which the number of sheets on which the images are formed at the first check level is equal to or larger than the second number of sheets.

9. The image forming system according to claim 1, further comprising a counter configured to count the number of sheets subjected to image formation by the printing unit, wherein the controller is configured to:

clear the number of sheets counted by the counter in a case where the adjustment unit performs the adjustment before the images are formed on the first number of sheets at the first check level, and clear the number of sheets counted by the counter in a case where the adjustment unit performs the adjustment before the images are formed on the second number of sheets at the second check level.

10. An image forming system comprising:

a printing unit configured to print an image on a sheet;

an inspection unit configured to inspect the sheet having the image printed thereon by the printing unit at a plurality of check levels having different check accuracies;

an adjustment unit configured to perform adjustment of an image quality of an image to be printed by the printing unit; and a controller configured to:

determine an adjustment frequency at which the adjustment is performed in accordance with each of the plurality of check levels, and control the adjustment unit to perform the adjustment based on the determined adjustment frequency.

11. The image forming system according to claim 10, further comprising:

an input unit for use in setting a check level; and a holding unit configured to hold a table indicating the adjustment frequency corresponding to the check level, wherein the controller is configured to refer to the table held in the holding unit to determine the adjustment frequency corresponding to the check level set through the input unit.

12. The image forming system according to claim 11, wherein the inspection unit is configured so that the check level is set by the input unit to notify the controller of the set check level, and wherein the controller is configured to determine the adjustment frequency in accordance with the check level notified by the inspection unit.

13. The image forming system according to claim 11, further comprising a display unit on which a check setting screen for setting the check level is to be displayed, wherein the input unit is configured to receive, as input, information of the check level set through the check setting screen, and wherein the controller is configured to determine the adjustment frequency based on the input information.

14. The image forming system according to claim 13, wherein the display unit is configured to display information indicating a relationship between the check level and the adjustment frequency, at the time of setting the check level through the check setting screen, and wherein the input unit is configured to receive, as input, an instruction of the check level set by a user in accordance with the displayed information.

15. The image forming system according to claim 11, further comprising an output unit configured to output, in a case in which the controller has determined the adjustment frequency, in a case where the check level set by the input unit does not correspond to the adjustment frequency, a notification for urging a user to change the adjustment frequency.

16. The image forming system according to claim 10, further comprising a reading unit configured to read the image formed on the sheet by the printing unit, wherein the inspection unit is configured to perform inspection by comparing the image read by the reading unit and a comparison source image.

17. The image forming system according to claim 16, wherein the inspection unit is configured to notify the controller of occurrence of abnormality in a case where it is determined that the image formed on the sheet is abnormal as a result of the comparing, and wherein the controller is configured to control the adjustment unit to perform the adjustment in a case where a notification of the occurrence of the abnormality is acquired.

18. The image forming system according to claim 10, wherein the controller is configured to:

count the number of printed sheets subjected to image formation by the printing unit, and control the adjustment unit to perform the adjustment in a case where the counted number of printed sheets reaches the adjustment frequency.

19. The image forming system according to claim 18, wherein the controller is included in any one of the printing unit and the inspection unit.

* * * * *